US011551443B2

(12) United States Patent
Elliott et al.

(10) Patent No.: US 11,551,443 B2
(45) Date of Patent: Jan. 10, 2023

(54) AUGMENTED REALITY AND WEARABLE TECHNOLOGY FOR VEHICLE SERVICE

(71) Applicant: Vehicle Service Group, LLC, Madison, IN (US)

(72) Inventors: Robert Elliott, Madison, IN (US); Darian Smith, Hanover, IN (US); Douglas Brown, Campbellsburg, IN (US); Matthew Webster, Madison, IN (US); Kirk Dawson, Trafalgar, IN (US); Michael Hill, Seymour, IN (US)

(73) Assignee: Vehicle Service Group, LLC, Madison, IN (US)

( * ) Notice: Subject to any disclaimer, the term of this patent is extended or adjusted under 35 U.S.C. 154(b) by 263 days.

(21) Appl. No.: 16/770,201

(22) PCT Filed: Feb. 4, 2019

(86) PCT No.: PCT/US2019/016490
§ 371 (c)(1),
(2) Date: Jun. 5, 2020

(87) PCT Pub. No.: WO2019/152916
PCT Pub. Date: Aug. 8, 2019

(65) Prior Publication Data
US 2020/0293778 A1    Sep. 17, 2020

Related U.S. Application Data

(60) Provisional application No. 62/625,412, filed on Feb. 2, 2018.

(51) Int. Cl.
*G06V 20/20*    (2022.01)
*G06T 19/00*    (2011.01)
(Continued)

(52) U.S. Cl.
CPC ............ *G06V 20/20* (2022.01); *G06T 19/006* (2013.01); *G06V 20/64* (2022.01); *G07C 5/006* (2013.01); *G07C 5/0825* (2013.01)

(58) Field of Classification Search
None
See application file for complete search history.

(56) References Cited

U.S. PATENT DOCUMENTS 10,216,796 B2    2/2019    Merg et al.
10,984,004 B2    4/2021    Merg et al.
(Continued)

FOREIGN PATENT DOCUMENTS

| EP | 3770104 A1 | 1/2021 |
| EP | 3770105 A1 | 1/2021 |
| WO | WO 2017/108764 A1 | 6/2017 |

OTHER PUBLICATIONS

Sohaisin: "AR in Service & Maintenance", Jul. 3, 2008 (Jul. 3, 2008), XP054976189, Retrieved from the Internet: https://www.youtube.com/watch?v=01e-oWA1v51&list=PLF2A564F6A77705A2, retrieved on Jun. 11, 2015.
(Continued)

*Primary Examiner* — Nicholas R Wilson
(74) *Attorney, Agent, or Firm* — Frost Brown Todd LLC

(57) ABSTRACT

An environment association system ("EAS") comprising: a processor and a memory; an object recognition process configured to identify objects within images, the objects including one or more of a vehicle, a vehicle lift, a vehicle repair tool, and an alignment fixture; and an EAS interface configured to communicate with a user device, the user device comprising a camera and a display; wherein the processor is configured to: determine, for at least one object in the set of objects, create a virtual overlay for the image based on the position of the at least one object within the image and a virtual marking associated with the at least one
(Continued)

object; and provide the virtual overlay to the user device, wherein the virtual overlay is configured to cause the user device to simultaneously display the image and the virtual overlay via the display. The system provides information about the alignment of lifting points of the object with lifting members.

20 Claims, 20 Drawing Sheets

(51) Int. Cl.
*G07C 5/00* (2006.01)
*G07C 5/08* (2006.01)
*G06V 20/64* (2022.01)

(56) References Cited

U.S. PATENT DOCUMENTS

| | | |
|---|---|---|
| 2014/0076665 A1 | 3/2014 | Nussbaum |
| 2016/0046300 A1 | 2/2016 | Wingfield et al. |
| 2018/0150805 A1 | 5/2018 | Shaver et al. |
| 2021/0004970 A1 | 1/2021 | Ruther et al. |
| 2021/0005031 A1 | 1/2021 | Brauer et al. |
| 2021/0019025 A1 | 1/2021 | Covington et al. |
| 2021/0390517 A1 | 12/2021 | Merg et al. |

OTHER PUBLICATIONS

International Search Report and Written Opinion dated Apr. 9, 2019 for International Application No. PCT/US2019/016490, 11 pages.
International Preliminary Report on Patentability dated Mar. 11, 2020 for International Application No. PCT/US2019/016490, 26 pages.

AUGMENTED REALITY AND WEARABLE TECHNOLOGY FOR VEHICLE SERVICE

PRIORITY

This application claims priority to U.S. Provisional App. 62/625,412, filed Feb. 2, 2018, the disclosure of which is incorporated by reference herein.

FIELD

The disclosed technology pertains to a system for using augmented reality to improve the safety and quality of vehicle service.

BACKGROUND

The vehicle service industry provides a wide variety of services to consumers including private owners, government fleets, and commercial fleets. With almost 270 million vehicles in the United States being driven by 210 million licensed drivers, it seems likely that nearly every adult in the United States will seek some form of maintenance or repair from a vehicle services provider. When such services are needed, the expectation is often that they be performed quickly, cheaply, and near-perfectly. For many, a vehicle is one of the most valuable pieces of property they own, and unavailability of a vehicle for any period of time may be a major disruption to family schedules, work schedules, and hobbies.

Given the high expectations for vehicle service, the vehicle service industry takes a somewhat conventional approach to training and overseeing technicians that provide these services. This could include the use of study materials, guided tutorials, various levels of certification, and similar approaches. As a result, the quality of vehicle services can vary drastically between providers. Even extremely well-trained technicians can lose a bolt, forget a cap, or leave a hose unattached. This is especially true in an industry that demands rapid and efficient repetition of tasks, with some technicians being benchmarked by the number of tasks they perform in an hour and penalized for inefficiency.

Even simple mistakes, such as forgetting to reattach a plug or hose, can result in damage to a critical component or system such as an engine or transmission, which could easily range into the tens of thousands of dollars in damage, and could cause a vehicle owner to lose the use of their vehicle for extended periods of time. What is needed, therefore, is an improved system for improving the safety and quality of vehicle services.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of vehicle services and tasks. While the disclosed applications of the inventors' technology satisfy a long-felt but unmet need in the art of vehicle service, it should be understood that the inventors' technology is not limited to being implemented in the precise manners set forth herein but could be implemented in other manners without undue experimentation by those of ordinary skill in the art in light of this disclosure. Accordingly, the examples set forth herein should be understood as being illustrative only and should not be treated as limiting.

Figure 1A:
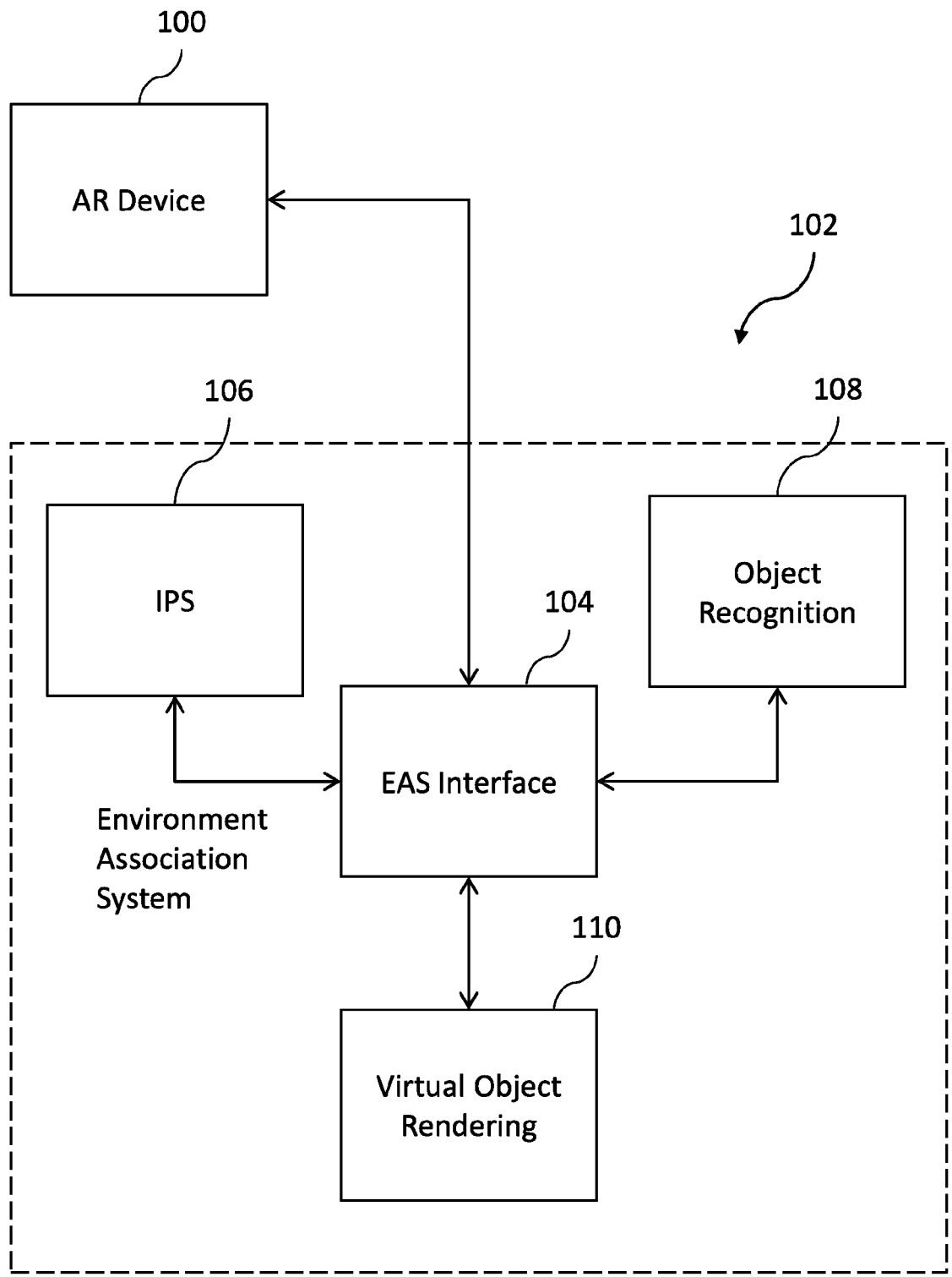
FIG. 1A is a schematic diagram of an exemplary system configured to provide service and safety features.
Figure 1B:
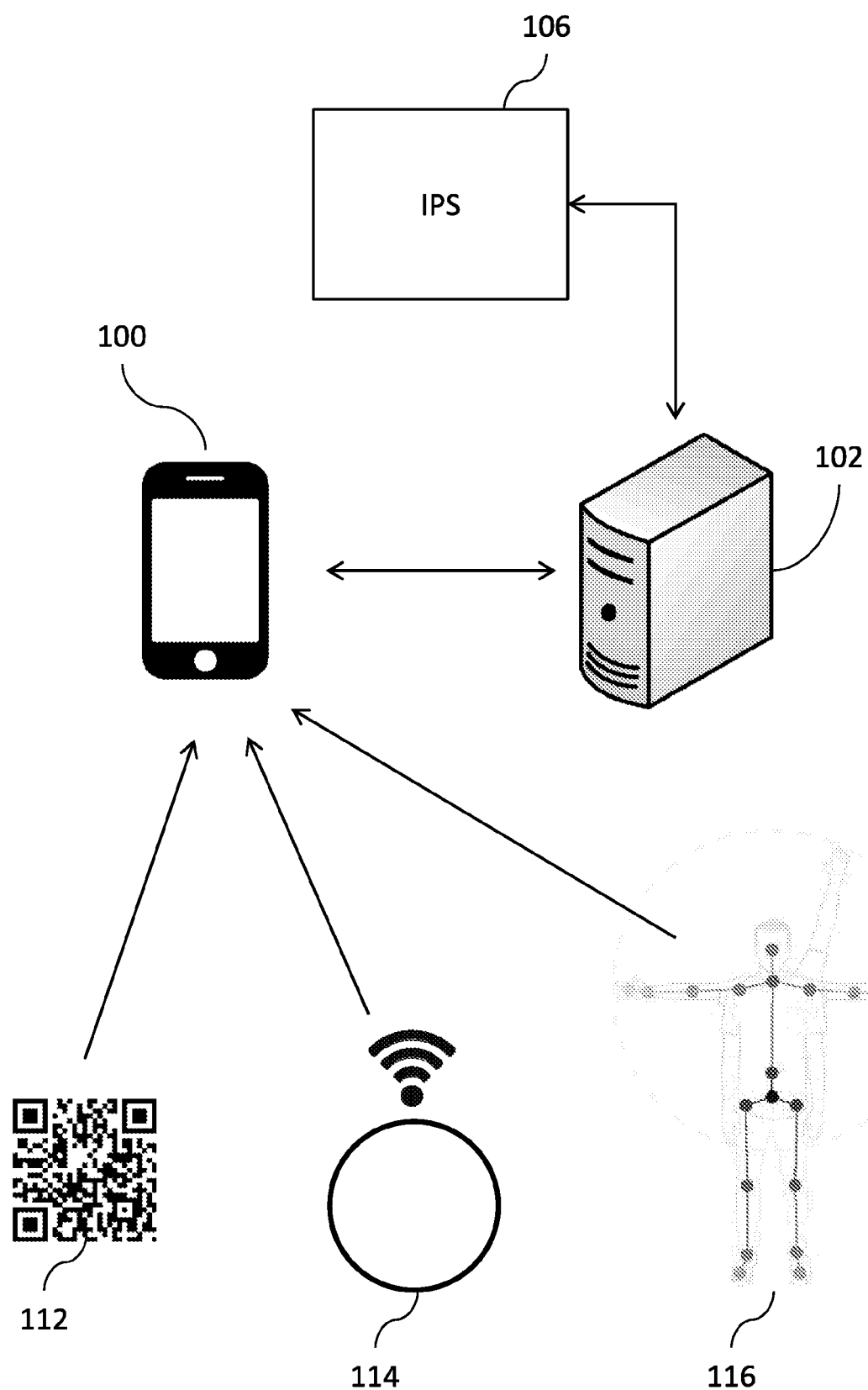
FIG. 1B is a schematic diagram showing additional components of an exemplary system configured to provide service and safety features.

Turning now to the figures, FIG. 1A shows a schematic diagram of an exemplary system configured to provide service and safety features to a user via an augmented reality ("AR") device (100). The AR device (100) may be a smart phone, tablet, or other handheld mobile device, or a wearable device, helmet, visor, glasses, or goggles, having similar features. While the specific features and implementation of the AR device (100) may vary widely, they may generally comprise a camera configured to capture video and images, a display configured to present information to a user, a processor and memory, and a network device configured to communicate with one or more additional devices via wired or wireless connections. Additional features and capabilities may include a user interface configured to receive input from a user, audio devices such as speakers and microphones which may provide additional ways to exchange information with a user, wired or wireless power sources, clips, straps, harnesses, head frames, face frames, or other positioning and fastening features that may allow the device to be easily held, stowed, carried, or worn, and other similar features.

The exemplary AR device (100) may be in communication with, or may itself contain, an environment association system ("EAS") (102). EAS (102) may, for example, comprise an EAS interface (104), an object recognition device or software (108), a virtual object rendering device or software (110), and an indoor positioning system ("IPS") (106). The EAS (102) uses a variety of inputs from the AR device (100) and elsewhere to associate an actual environment with a virtual environment in order to produce a mixed or augmented reality that may be viewable on the AR device (100) or another display. As indicated, any one or more of these components may be a device itself (e.g., a system or server configured to perform a specific set of tasks), or it may be a set of software instructions executable by another device to perform a specific set of tasks (e.g., object recognition software that may be executed by the AR device (100) device itself, or an EAS (102)). An EAS (102) might not comprise each component shown in FIG. 1A, but the availability of additional components may improve the speed, accuracy, and quality of the AR features offered via the AR device (100). Additionally, some features or components of the EAS (102) may be a feature or component of the AR device (100) itself or may be executed by the AR device (100), while others may be a component of or executed by a separate computing device.

The object recognition feature (108) may be configured to receive images or video from a camera of the AR device (100) and identify objects contained within that image using static (e.g., configured to identify a specific set of objects or objects having a specific set of characteristics) or dynamic image analysis (e.g., aided by machine learning and artificial intelligence to identify an ever-growing set of objects or characteristics). This could include, for example, identifying the presence of a humanoid figure or body portion, a vehicle, a vehicle lift, a lift arm, a wheel, a nut, a bolt, a clamp, or other hardware, and similar objects within a video or image in near real-time. Object recognition may be performed in a variety of ways, as will be discussed below in reference to FIG. 1A.

The virtual object rendering feature (110) may be configured to produce 2D or 3D objects and constructs for rendering and overlaying upon image or video data. This could include producing virtual object images that may be overlaid upon a set of image or video data produced by the AR device (100). The combined actual image and virtual object may then be displayed on the AR device (100) as a viewable augmented reality environment. In other embodiments, the virtual object images are projected onto substantially transparent object in the user's field of vision such as eyeglasses, safety goggles, and other transparent objects as will occur to those skilled in the art.

The IPS (106) may comprise a variety of static information about a specific environment, as well as real-time monitoring of one or more spaces, objects, characteristics, or other aspects of that environment. One basic example may be a room having one or more motion-sensing devices within the room and a system configured with information characterizing the physical dimensions and shape of the room. The IPS (106) may be able to generate information about the room, for instance, through depth-sensing cameras or 3D laser scanning (not shown). The system may receive output from the motion-sensing devices and combine that output with stored information related to the room in order to produce a viewable display of the room where motion is being detected in near real-time. In the context of augmented reality, an IPS (106) may be useful to determine where, within a configured space, one or more AR devices (100) or other devices or objects are located based upon triangulation using GPS, Wi-Fi, or Bluetooth, for example. A virtual object rendering (110) feature may use the ability to determine the location of an AR device (100) and an object being viewed by that AR device (100) within a three-dimensional space to provide more accurate placement, rotation, and scaling of virtual objects.

The EAS interface (104) may, in some implementations, serve as a compatibility or abstraction layer between an AR device (100) and the EAS (102) to provide greater flexibility across varying hardware configurations. For example, the EAS interface (104) may be servicing an AR device (100) that is only capable of rendering 2D virtual objects, while a particular EAS (102) may by default produce 3D virtual objects. In such a case, the EAS interface (104) may flatten, scale, and/or rotate the 3D virtual objects before providing them to the AR device (100). As another example, the EAS (102) may use an IPS (106) to provide better positioning and scaling information to the virtual object rendering (110) feature during use. However, if the IPS (106) becomes unavailable or is not installed in a particular location, the EAS interface (104) may allow the EAS (102) to gracefully handle the lack of such inputs.

The particular features and implementations of AR devices (100) will vary greatly, and they may also be provided by different manufacturers, use different software operating systems or firmware, and have other variances. The EAS interface (104) may be configured to sift through all the information, input, and output being provided by a variety of AR devices (100) and the EAS (102) itself to normalize all such inputs and outputs into a format that can be handled despite these variances. In this manner, an EAS (102) system provider may enable differing AR devices (100) to quickly integrate with their system without being concerned with incompatibility, runtime errors, or corruption of data.

FIG. 1A is a schematic diagram showing additional components of an exemplary system configured to provide service and safety features, particularly in relation to object recognition (108). An AR device (100) has a variety of ways to interact with its environment and gather information that may be used to identify objects or features of that environment. This could include, for example, receiving information from an IPS (106) on static or dynamic features within that environment, but it could also include directly interacting with features of that environment such as optical identifiers (112), signal identifiers (114), and image recognition (116).

An optical identifier (112) may be, for example, a QR code, barcode, color code, or other coded information set that is visible to the human eye, or visible to a corresponding image capture device of the AR device (100). This could include capturing information from a QR or other code with a camera of an AR device (100), but it could also include capturing a reflected light, induced fluorescence, or other signal with a camera or other sensor of an AR device (100). Optical identifiers (112) may be used in object recognition (108) by, for example, permanently or temporarily marking the object that is to be identified with the optical identifier (112). In the context of vehicle service, this could include placing a QR code sticker on an exhaust component, color coding bolts or nuts, stamping hoses with a barcode, or other encoding as will occur to those skilled in the art. When AR device (100) captures or receives the coded information, that information can be used to determine that the marked object is proximate to the location of the optical identifier (112).

Signal identifiers (114) may include RFID chips, Bluetooth transceivers, and other wireless chips, devices, or beacons that may be used similarly to an optical identifier (112) as described above. Such identifiers may be detected by an AR device (100), an IPS (106), or both, in order to provide the EAS (102) with additional information about the environment. For example, in the context of object recognition (108), an RFID sticker could be placed on an exhaust component, a Bluetooth beacon could be placed on a damaged tire, or other similar marking methods could be used.

An image recognition (116) feature may use image data alone or in combination with other data sources to identify objects within that image data. This could include, for example, capturing an image or video of a person and identifying that object as a person based upon joint characteristics, movement, facial features, or other similar characteristics. This could also include capturing an image of an exhaust component, a bolt, or a hose, and detecting that object within the image based upon object boundaries and/or other types of analysis such as image enhancements, pattern matching, contour matching, or Haar cascades, then checking that objects against a database of known objects to identify characteristics such as model number or type of the exhaust component, bolt, or hose. In the system of FIG. 1A, the EAS interface (104) may handle a variety of inputs to allow for object recognition (108) across a variety of implementations (e.g., implementations using only one data source (112, 114, 116) or implementations using multiple data sources). Effective object recognition (108) may allow for an increased quality and quantity of virtual markings, identifiers, or objects that may be introduced into the augmented reality view offered via the AR device (100).

Object recognition (108) may be performed locally or remotely to the EAS (102) and may use data that is locally or remotely available to the EAS (102). For example, in some implementations the EAS (102) may receive object recognition (108) datasets from a remote source from time to time, then may use those datasets as inputs to an object recognition (108) process, along with a captured image, to identify objects or other attributes present within that image. Such datasets may include, for example, comparison pictures (e.g., pictures of vehicle wheels, vehicle lift points, and other vehicle components), pattern matching algorithms (e.g., a process that may help identify an object within a picture based upon color patterns, edge recognition, or other characteristics), environmental matching algorithms (e.g., a process that may help identify an object based upon an environment or location in which the image is captured). Such datasets may be combined with local datasets having similar data, with such local datasets being customized for a particular location or set of locations, such as locally captured comparison pictures from vehicles serviced at that location, locally configured pattern matching for specialized vehicles or components that are serviced at that location frequently, or locally configured environmental matching algorithms that account for the one or more IPS (106) at a location to determine the orientation and location from which a particular image is captured, and objects that are likely to be present within that image. Object recognition (108) process can then limit or otherwise adapt its recognition algorithms to use that knowledge and more reliably identify objects in a particular view.

Locally produced datasets may be provided to a remote source from time to time and integrated into a global object recognition dataset, such that the dataset may be improved and refined over time. For example, as images are captured at a location and objects are identified within the images, and such identifications are confirmed or indicated as erroneous by a user, such information may be provided to a remote source and integrated into a dataset. This may be especially useful where one or more technicians within an environment are using an AR device (100) as part of their normal job duties, since the AR device (100) may be able to passively capture images and produce relevant dataset information that may be integrated into a global dataset automatically.

Figure 2A:
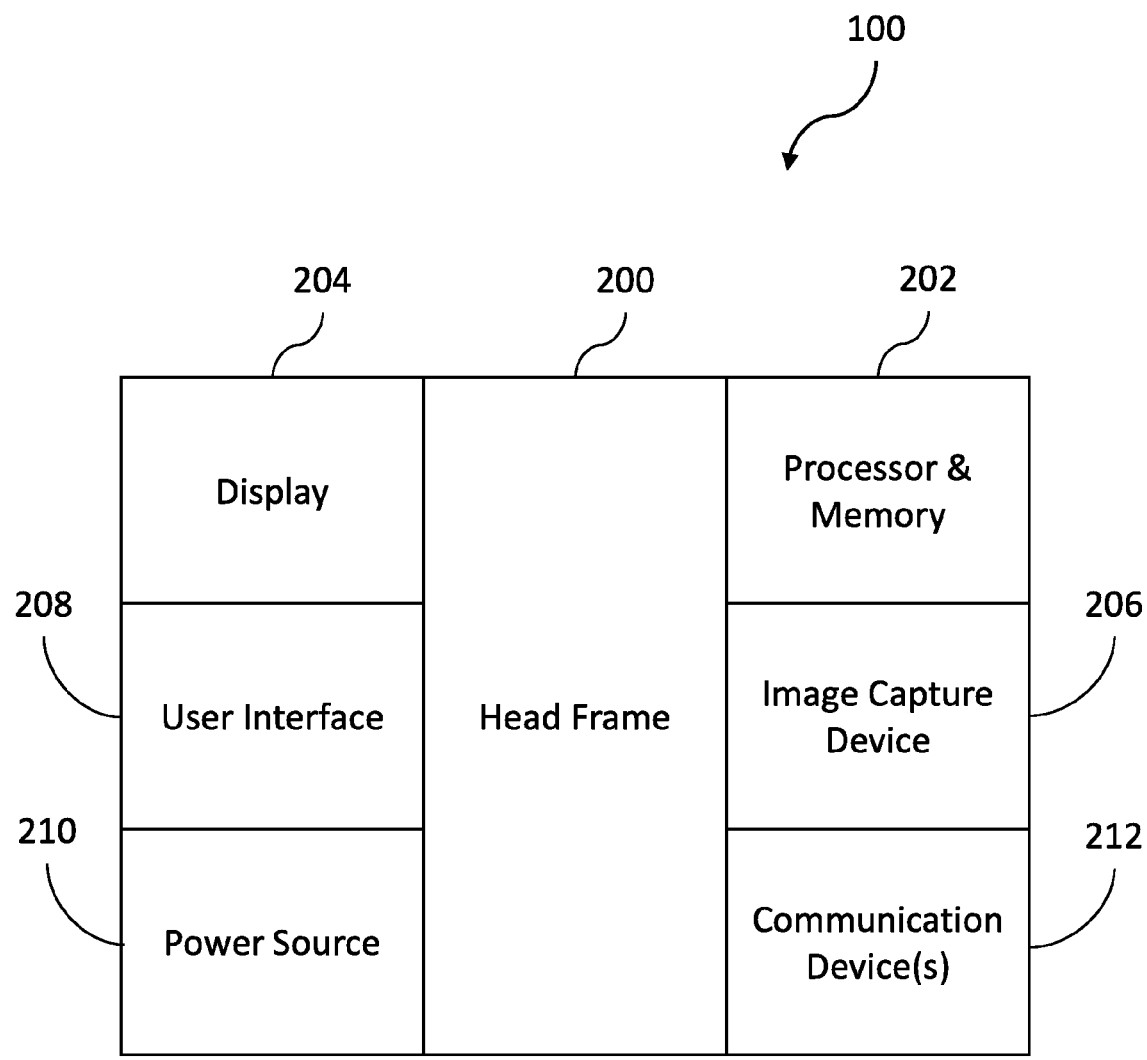
FIG. 2A is a schematic diagram of an exemplary augmented reality device.
Figure 2B:
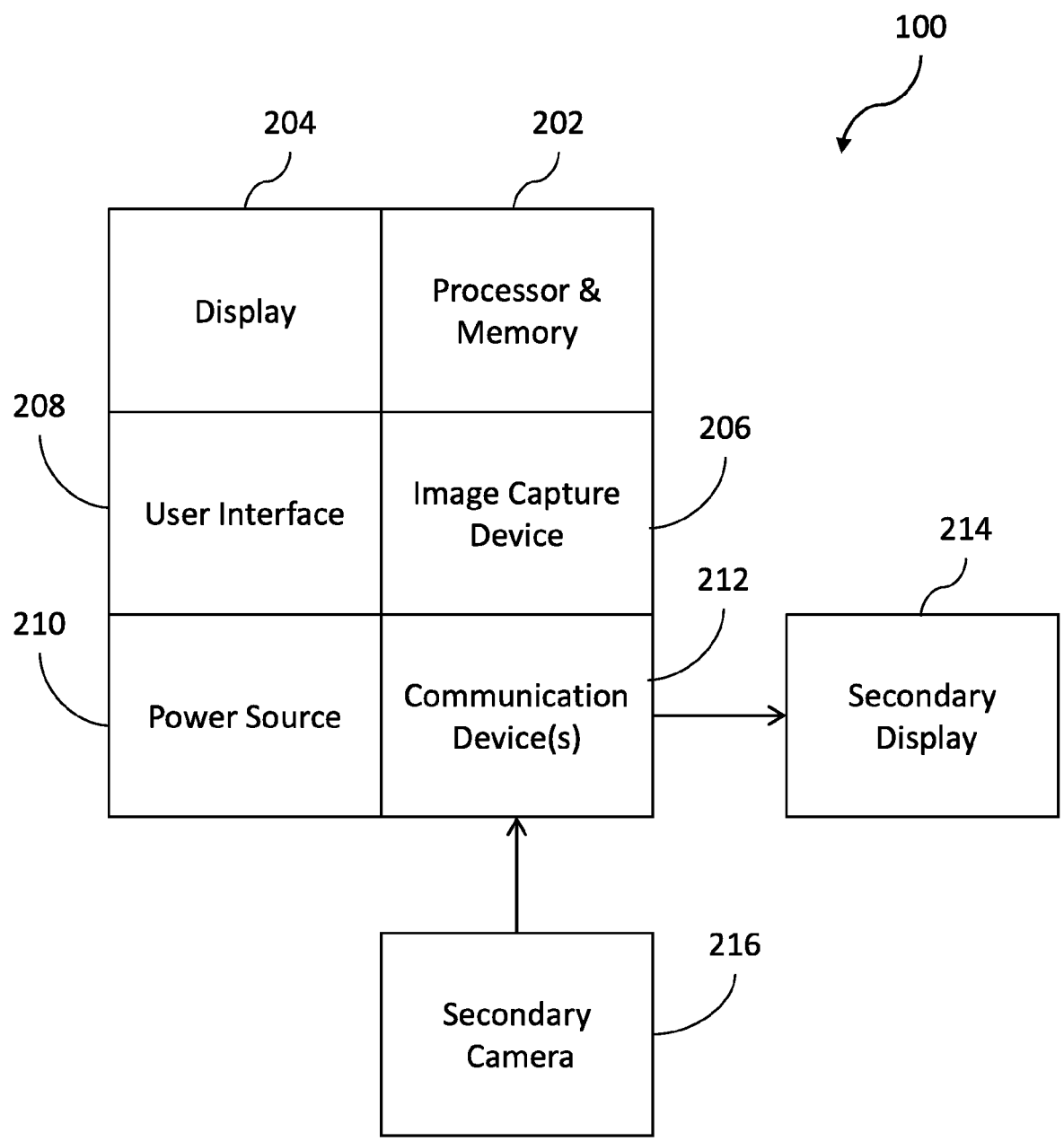
FIG. 2B is a schematic diagram of an additional exemplary augmented reality device.

FIGS. 2A and 2B show exemplary implementations of AR devices (100) such as might be used with the system of FIG. 1A. FIG. 2A shows an AR device (100) implemented as a head-mounted display ("HMD") meant to be worn on the head or face to enable real-time aiming and capturing of images and video, and real-time display of augmented environments as the wearer views his or her environment. This AR device (100) comprises a head frame (200) adapted to be worn on the head or face and may also comprise a processor and memory (202), a display (204), an image capture device (206), a user interface (208), a power source (210), and one or more communication devices (212).

The processor and memory (202) may be configured to receive and manipulate data and provide instructions to various components of the AR device (100) to enable the use of its features. The display (204) may be, for example, a partially or wholly transparent LED display positioned within the view of the wearer and configured to display image data captured by the image capture device (206) in near real-time, or display (204) may be configured to provide an unobstructed view of the environment within view of the wearer, and capable of rendering virtual objects to create augmented environments. The display may also be a projection-style display that projects images onto glasses or a holographic image.

The image capture device may be any of a variety of image or video cameras (206), or other similar devices capable of capturing or producing image data from the environment viewable through the AR device (100). The user interface (208) may be one or more of a touchscreen, speech capture and recognition, eye or facial recognition, neural interface, or external keyboard or input device operable to provide user inputs and information to the AR device (100). The power source (210) may be, for example, a battery or wired power source. The communication devices (212) may be one or more of a Wi-Fi transceiver, Bluetooth transceiver, RFID transceiver, IR transceiver, USB or ethernet connector, or another similar device allowing the exchange of information between the AR device (100) and one or more other devices, such as the EAS (102).

The AR device (100) of FIG. 2B comprises similar components as that of FIG. 2A but lacks a head frame (200) and may be instead designed to be held in the hand or placed in a pocket or carrier. This AR device (100) may be, for example, a smart phone, tablet, or wearable computer that may be used or viewed when desired, rather than being worn on the face or head and used passively. Such an AR device (100) may have additional external devices such as, for example, a secondary display (214) and a secondary camera (216) that are designed to be worn on the head or face, while the AR device (100) itself is worn on an arm or carried in a pocket or holster. These external devices may be in communication with the AR device (100) via one or more of the communication devices (212). This could include, for example, an external display (212) wearable over one or both eyes, and in communication with the AR device (100) via a cable or wireless connection. Other variations on the AR device (100) exist and will be apparent to one of ordinary skill in the art in light of the disclosure herein.

Figure 3:
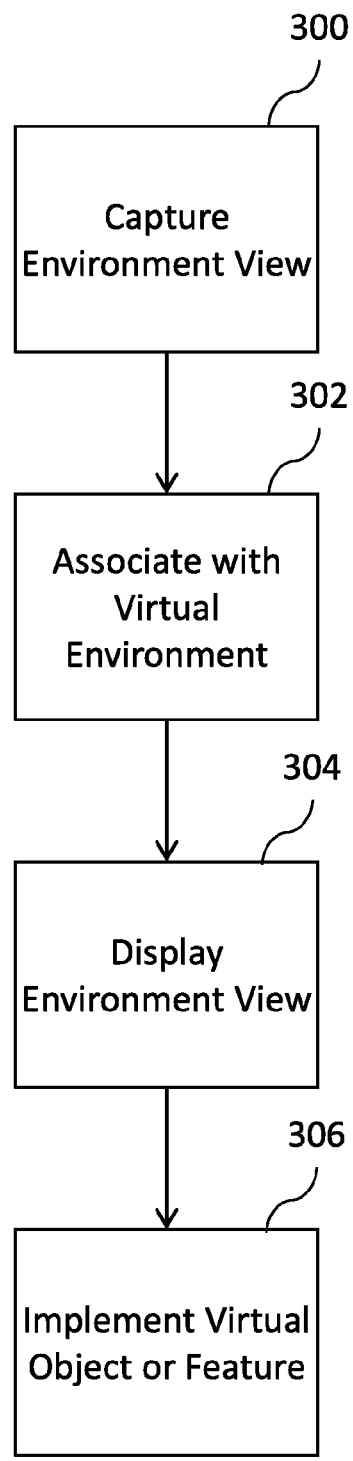
FIG. 3 is a flowchart of a set of high-level steps that a system could perform to associate and display a virtual environment within an actual environment.

FIG. 3 is a flowchart of a set of high-level steps that a system could perform to associate and display a virtual environment within an actual environment. The AR device (100) may capture (300) an environment view via a camera, which view could comprise video, images, audio, and/or other data. The EAS (102) may then associate (302) the captured or actual environment with a virtual environment (302) by identifying objects, areas, locations, or other features of that actual environment that are recognizable by or significant to the virtual environment. This could include identifying an area of the actual environment that is hazardous due to nearby equipment, identifying a fall or trip hazard on the floor of the actual environment, or identifying one or more objects such as persons, vehicles, or lifts within the actual environment. The system may also display (304) the actual environment via the AR device (100) or another device (e.g., a monitor device at a supervisor or instruction station) and may also implement (306) one or more virtual objects or features based upon the virtual environment association (302) by causing them to be rendered within the actual environment view displayed by the AR device (100).

This could include marking dangerous areas or objects with high-visibility indicators; marking multiple steps of a procedure with visible numbers, letters, or prompts; marking a nut or bolt that needs to be removed with a visible indicator; or the like. The steps of FIG. 3 may be configured and performed in near-real time so that a user may view the actual environment with or through an AR device (100) and view the virtual object or features that are implemented (306) in near real-time. As one example in the context of vehicle service, a technician could enter a work area and place an AR device (100) on his face and immediately view one or more vehicles, lifts, and associated equipment through the AR device (100), and additionally view overlaid information describing characteristics of those vehicles or lift that have been virtually added to the environment (e.g., whether a vehicle task is in progress or complete, whether a particular lift is usable, etc.). The general concepts that have been described above in the context of augmented reality and vehicle service may be used to implement a variety of features and controls in order to improve the safety and quality of vehicle services.

Figure 4:
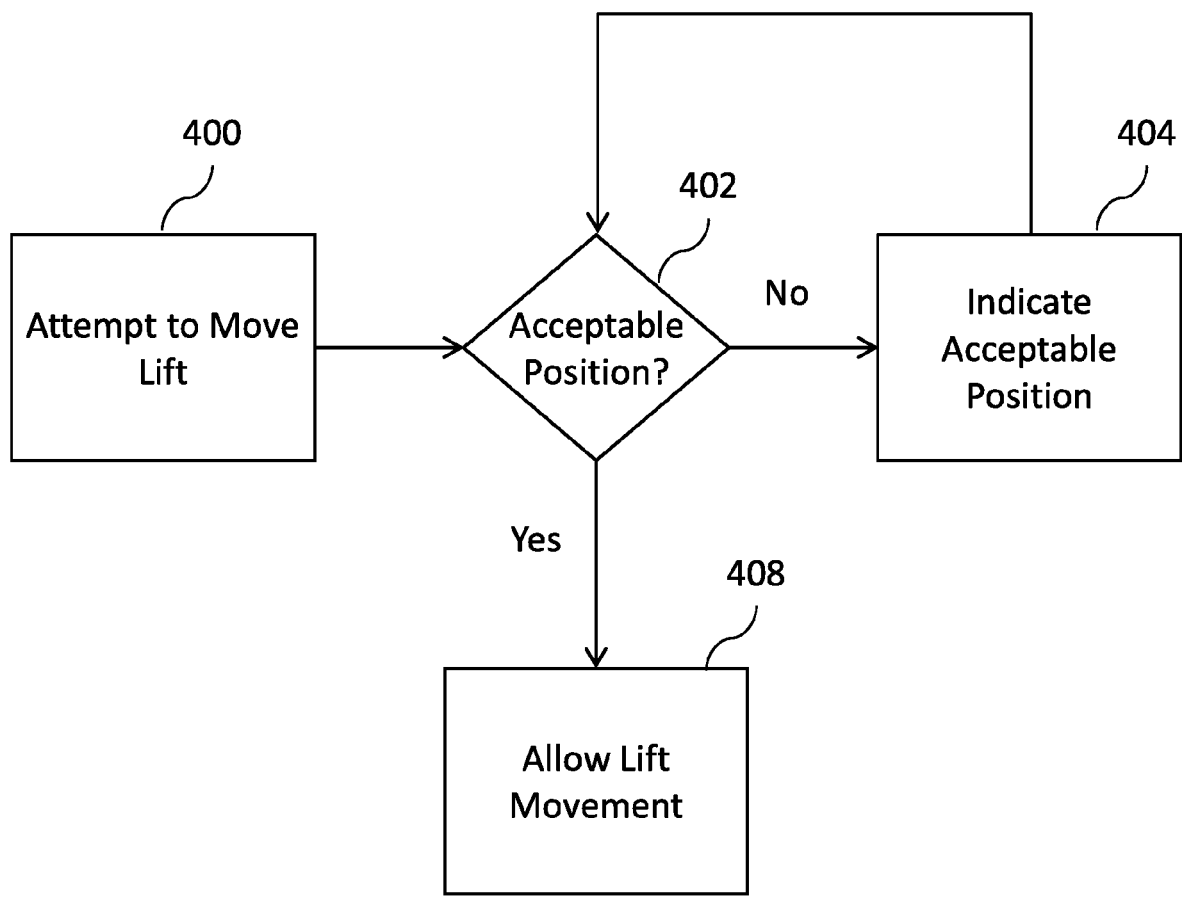
FIG. 4 is a flowchart of a set of steps that a system could perform to provide additional safety features during lift operation.

FIG. 4 shows a set of steps that a system could perform to provide additional safety features during a lift operation. In a vehicle service area that supports the use of a device such as the AR device (100), when a technician attempts (400) to raise, lower or otherwise move a lift or another piece of heavy equipment using a control device for that piece of equipment, the system may prevent such movement unless the technician is in a safe position to do so. The technician's position may be verified using one or more of the IPS (106) and the AR device (100). For example, the IPS (106) may detect the position of the AR device (100) being held or worn by the user and provide that information to the EAS (102), which may lockout the equipment control if the position is not acceptable, or if the system determines that the AR device (100) is not being held or worn based upon accelerometer or other data. As another example, the AR device (100) may capture an image of what the technician is viewing and provide that to the EAS (102).

Object recognition may then be used to identify objects within that view or identify the perspective of the view itself and compare it to known safe viewing positions based upon identified objects or perspectives. If such information indicates that AR device (100) is not an acceptable position (402), the display of AR device (100) may be augmented with virtual indicators to indicate (404) an acceptable position. If the position is acceptable (404), the EAS (102) may unlock operation of the equipment and allow movement (408) so long as the position remains substantially the same or in an acceptable position.

An example of the above might include a technician wearing a glass, visor, or goggle-style AR device (100) interacting with a button, device, or speech recognition feature to cause (400) a lift be lowered. Safe lowering of the lift might require that the technician be standing in a predetermined range (for example, within between 5 and 15 feet) of the lift, at ground level, and from a position where the area below all four corners of the lowering vehicle are visible. In this example, the lift itself has arms extending to the area of each vehicle corner, and the bottom of each arm is marked with a QR code style optical identifiers (112). Initially, the technician is standing at a position where object recognition only detects three of the optical identifiers (112), indicating an unacceptable position (402). The EAS (102) then renders a virtual arrow via the AR device (100) indicating the direction the technician should move to reach a safe viewing area. The EAS (102) may additionally mark (404) the viewable corners of the lift with virtual lights, checkmarks, numberings, or other indicators to help the technician maintain sight of those points. When the technician follows these prompts and moves to an acceptable position (402), the EAS (102) may re-evaluate the perspective and once the position is verified as acceptable (402) optionally provide visual feedback and allow the lift to move (408). Other points of reference on the lift or the work area may be used to establish orientation and distance between the technician and the lowered vehicle.

Figure 5:
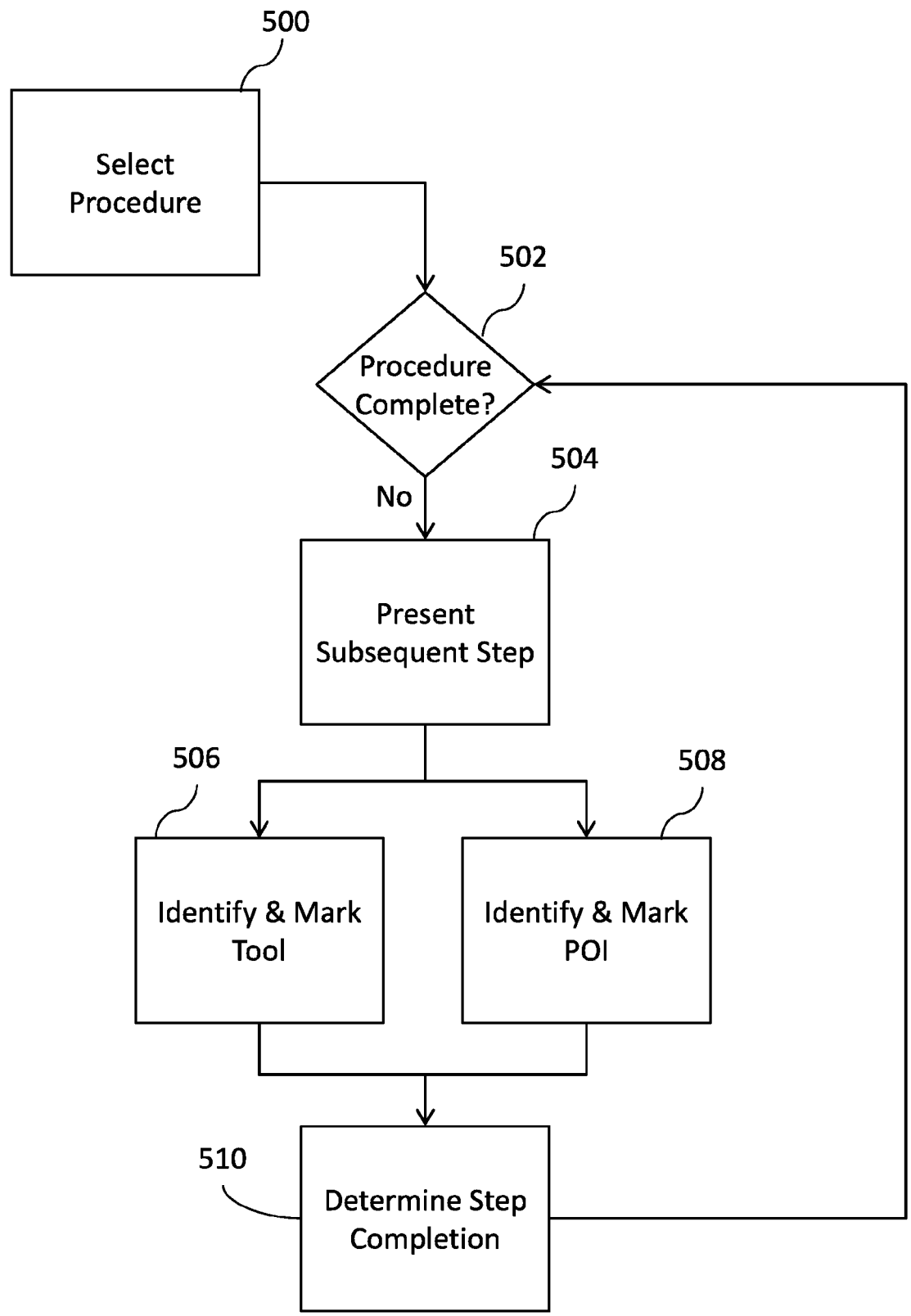
FIG. 5 is a flowchart of a set of steps that a system could perform to provide guidance during the performance of a procedure.

Turning now to FIG. 5, that figure shows a flowchart of a set of steps that a system could perform to provide guidance during the performance of a procedure. A supervisor or technician may select (500) a procedure with one or more steps to be performed by a technician using an AR device (100). Until the procedure is complete (502), the EAS (102) will render and present, via the AR device (100), virtual information on the current and/or next step (504). This could include identifying and marking (506) tools that are needed for that step, identifying and marking points of interest ("POI") on the vehicle, equipment, or environment for that step (508), marking parts of the vehicle with parts numbers and descriptions, or other similar virtual augmentations. Based upon the technician's interactions with marked tools (506) and one or more POIs (508), or based upon input from the technician themselves or a supervisor, a step may be determined as competed (510). As each step is completed (510), until the procedure is complete (502), a subsequent step may then be presented (504).

As an example of the above, a technician may be wearing an AR device (100) and may select to replace an exhaust gasket (500) on a vehicle that is in for service. The EAS (102) may determine the type of vehicle (e.g., based upon a static configuration entered at the time the vehicle enters service, based upon object recognition of the vehicle itself, or both) and retrieve a set of tools, tasks, and parts needed for that procedure. A first step may then be presented to the technician via the AR device (100), which may include, for example, virtually marking a drill with a tool icon (506), virtually marking a properly sized socket for removing several bolts, virtually marking the bolts that need to be removed (508) to release the gasket, and virtually marking the replacement gasket (508). As the technician looks around the work area, any virtually marked object will be called out via the AR device (100).

When the first step is completed (510) based upon a voice command or input command from the technician, a second step is presented (504). The second step may include, for example, virtually marking the position for placement of the new gasket (508), virtually marking the bolts as they are replaced (508), and providing torque settings for the drill (506) to prevent overtightening. Once this step is completed (510), the procedure is complete (502), and the AR device (100) ceases to provide augmented guidance and virtual objects for that procedure and provides notification that the process has been completed. Pictures and other records may be generated upon completion of the process.

Figure 6:
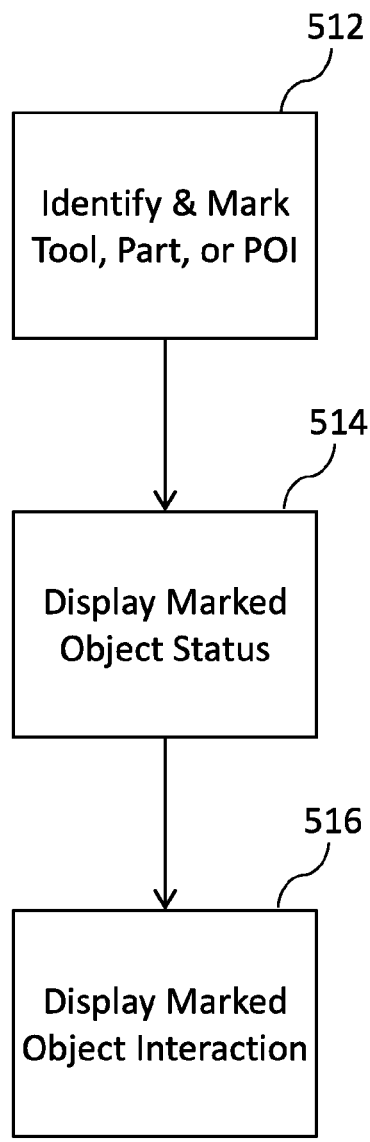
FIG. 6 is a flowchart of a set of steps that a system could perform to provide virtual object markers.

FIG. 6 is a flowchart of a set of steps that a system could perform to provide virtual object markers. This could be performed generally, or as part of another feature or procedure such as that shown in FIG. 5 where objects such as tools, parts, or POI are being marked. Whenever such an object is positively identified (512) by the EAS (102), additional information (514) and commands or interactions (516) may be available and may be presented virtually via the AR device (100). For example, if a tire is being inspected, the AR device (100) may identify the tire based upon an optical identifier (112), and in near-real time may overlay status information (514) on or near the technician's view of the tire such as estimated mileage life, estimated service life, warranty information, inflation specifications, maintenance notes generated by the shop or the customer, and/or replacement cost. The AR device (100) may also present interaction options, such as ordering a new tire, ordering a tire pressure sensor kit for the tire, purchasing a warranty or insurance on the tire, and other interactivity options, which may then be selected by the technician using speech or other interfaces.

Figure 7:
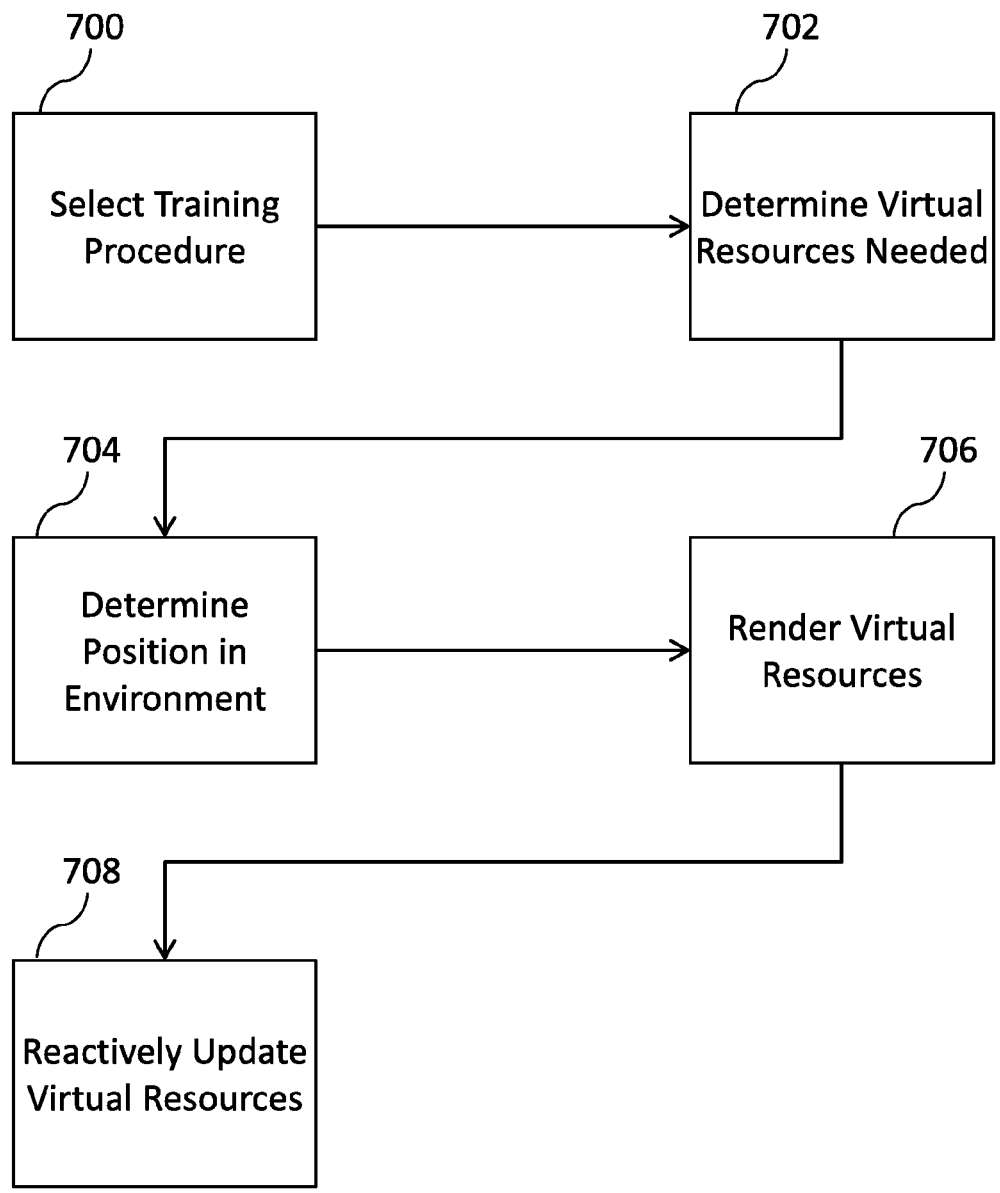
FIG. 7 is a flowchart of a set of steps that a system could perform to provide virtual training resources.

FIG. 7 is a flowchart of a set of steps that a system could perform to provide virtual training resources to a trainee. A trainee or supervisor may select (700) a training procedure to cause the EAS (102) to determine (702) one or more virtual resources that are needed to present the training interface to a trainee via the AR device (100). For example, if a training procedure for a particular vehicle is selected, it may determine that a virtual rendering of the vehicle is needed based upon the current inventory of vehicles that are on the lot or in the shop. As another example, if a training procedure is selected requiring a certain lift, a virtual rendering of the lift may be needed if that type of lift is not available immediately or is not present at the location. The system may also determine (704) the position and scale of the virtual resources within the environment based upon data from the IPS (106) or an AR device (100). This could include, for example, a floor space that is marked at each corner and through the space with one or more optical identifiers (112) that each correspond to a virtual object (e.g., a lift post, a lift track, a vehicle, etc.). Once the virtual resources (702) and their positions (704) are known, the virtual resources may be rendered in the actual environment via the technician's AR device (100).

The system may also reactively update (708) the virtual resources based upon a user's interactions with the virtual resources through speech, touch, or other inputs provided via the AR device (100), based upon inputs from a supervisor or instructor, a technician that has previously performed service on the vehicle, or another device (e.g., an augmented tool placeholder device that may have a tool or control pad mapped and rendered to it). In this manner, one or more technicians may view and interact with an augmented reality training scenario through AR devices (100). Augmented reality training scenarios may include interactive animations to mimic vehicle service. The steps of FIG. 7 may also be combined with other features or methods. For example, the steps of FIG. 7 may be performed in conjunction with the steps of FIG. 5 to provide a training interface that allows the steps of FIG. 5 to be performed wholly or partially within an augmented reality environment.

Figure 8:
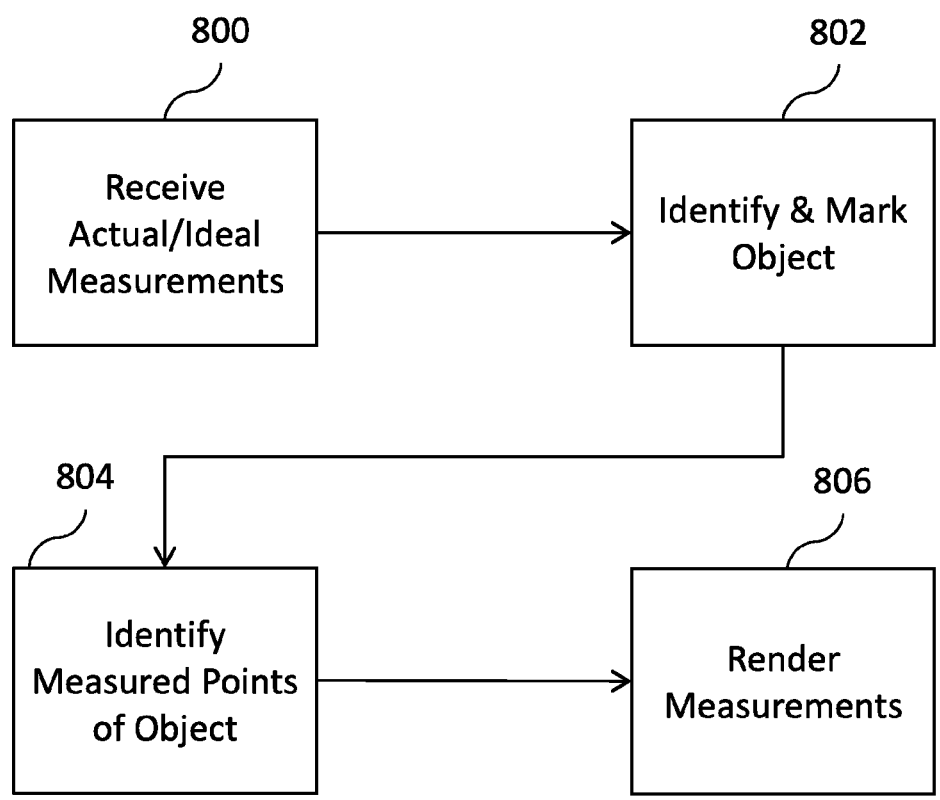
FIG. 8 is a flowchart of a set of steps that a system could perform to provide virtual damage reference points during collision repair.

Referring now to FIG. 8, a flowchart shows of a set of steps that a system could perform to provide virtual damage reference points during collision repair. Conventional collision repair, in which a vehicle frame or panels need to be moved, bent, or formed from a post-collision position back to a pre-collision position, frequently involves measuring a number of points along a vehicle frame or panel where a correction needs to occur, as well as the direction and magnitude of that corrective movement. Those measured points may then be displayed on a computer or screen on a static image of the vehicle and can be used as a reference during the repair. In other conventional applications, those measured points may be displayed directly on the vehicle using a laser, marker light, or other visible light source. Frequently shifting focus between a vehicle and a reference display may be distracting and time consuming, and lights projected onto a vehicle may be interrupted by a person or other object moving within their path, making many of the conventional solutions non-ideal, but various embodiments of the present system can overcome these problems.

With an AR device (100), collision repair-related measurements may be rendered as virtual objects and displayed to a technician within their view of the AR device (100) in near real-time, where they may be referred to without shifting focus from the work in progress and cannot be blocked by a person or other object. As measurements are taken of the damaged vehicle parts, they may be received by (800) the EAS (102). As a technician views the damaged parts with the AR device (100), object recognition may be used to identify and mark (802) the damaged parts, and the corrective measurements may also be identified (804) on the damaged part, and rendered (806) in some form to indicate the direction and magnitude of any change in the part that is needed to complete the repair.

As an example, a vehicle may have a frame member that is bent at approximately the midpoint post-collision, such that the midpoint of the frame is displaced 1.5 inches in the direction of the bend, relative to the two ends of the member. The EAS (102) may receive (800) these measurements, which may include the member's actual measurements post-collision, as well as the member's ideal specification or pre-collision measurements. When the technician begins the frame repair, the AR device (100) may capture images or video of the member, and object recognition may be used to identify and virtually mark (802) the member by, for example, providing a high-contrast outline around the edge of the member, so that it may be distinguished from other frame members or other nearby vehicle components. Object recognition may also be used to identify the damaged midpoint of the member (804), and the damaged midpoint portion may be highlighted or outlined (or highlighted or outlined differently from other parts) to indicate that it deviates from the ideal measurements (806). Rendering (806) measurements could be performed in a variety of ways.

In one example, deviations may be rendered in one or more high-contrast colors to show the magnitude of the deviation (e.g., a displacement of 1.5 inches may be highlighted in red, and as the member is manipulated back to an ideal state the color may change along a gradient to yellow, then green). In another example, outlines may be rendered for both the post-collision member, in a first color, and for the pre-collision member, in a second color, so that the technician can view the member's starting point and ending point during the repair through the AR device (100). In another example, the damaged member may be marked with simple dots, arrows, X's, or pointers, with the direction and magnitude of the needed corrective change being indicated by numbers and/or text. Damaged members may also be marked with arrows and/or images to indicate the set-up and pulling direction of frame-straightening equipment. Other ways in which the corrective measurements may be rendered (806) will be apparent to one of ordinary skill in the art in light of this disclosure.

Figure 13:
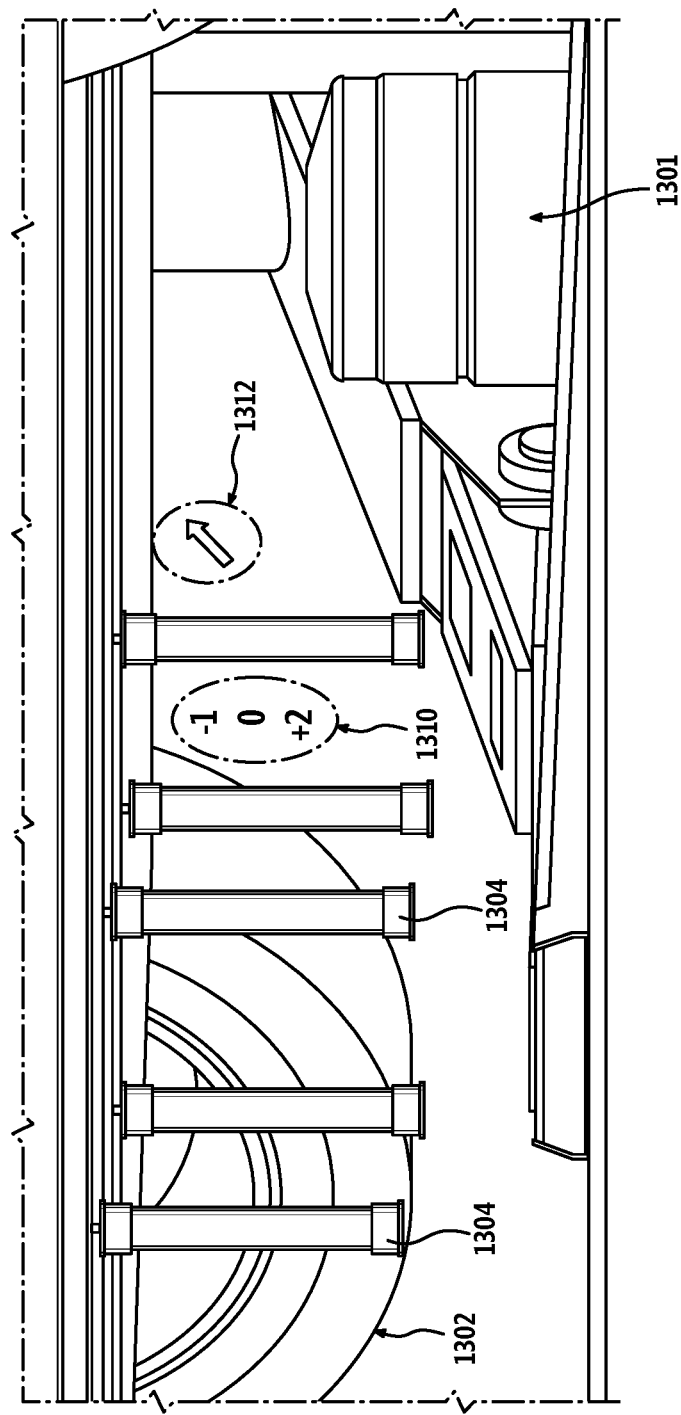
FIG. 13 is a schematic drawing of a first augmented view of the underside of a vehicle in a service bay.
Figure 14:
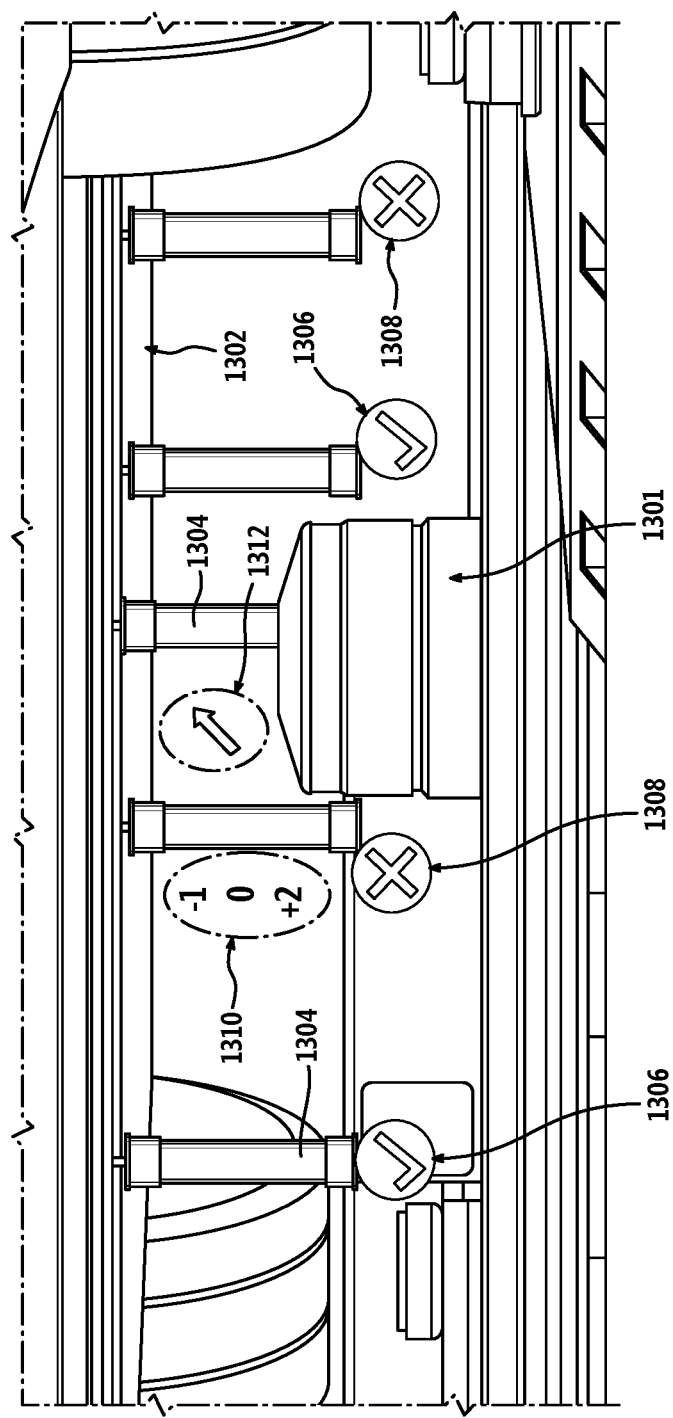
FIG. 14 is a schematic drawing of a second augmented view of the underside of a vehicle in a service bay.

FIGS. 13 and 14 illustrate exemplary displays for AR device (100) of this nature. In these illustrations, vehicle (1302) has been outfitted with alignment fixtures, or targets (1304), that hang from various points of interest on the frame of vehicle (1302). Laser scanner (1301) identifies the position of each target (1304) in 3-space and, based on the expected relative position of each target (1304) given the model of vehicle (1402), determines whether the location on vehicle (1402) to which each target (1304) is attached needs to be bent or otherwise adjusted to bring that frame piece into position as taught, for example, in US Patent Application Publication US 2019/0018234 A1. Laser scanner (1301) communicates sufficient information to AR device (100) for AR device (100) to render indicators near each target (1304) showing that it is within acceptable tolerance of the desired position (1306) or out of position (1308). When a particular target (1304) is selected using some user interface device, or is close enough to the center of the user's field of view for a sufficient length of time, or is close enough to the user's location, or on other conditions as will occur to those skilled in the art, AR device (100) supplements the overlay with displacement information (1310) characterizing the correction that needs to be made to that target (1304) and/or the sum direction (1312) of the required correction.

Figure 9:
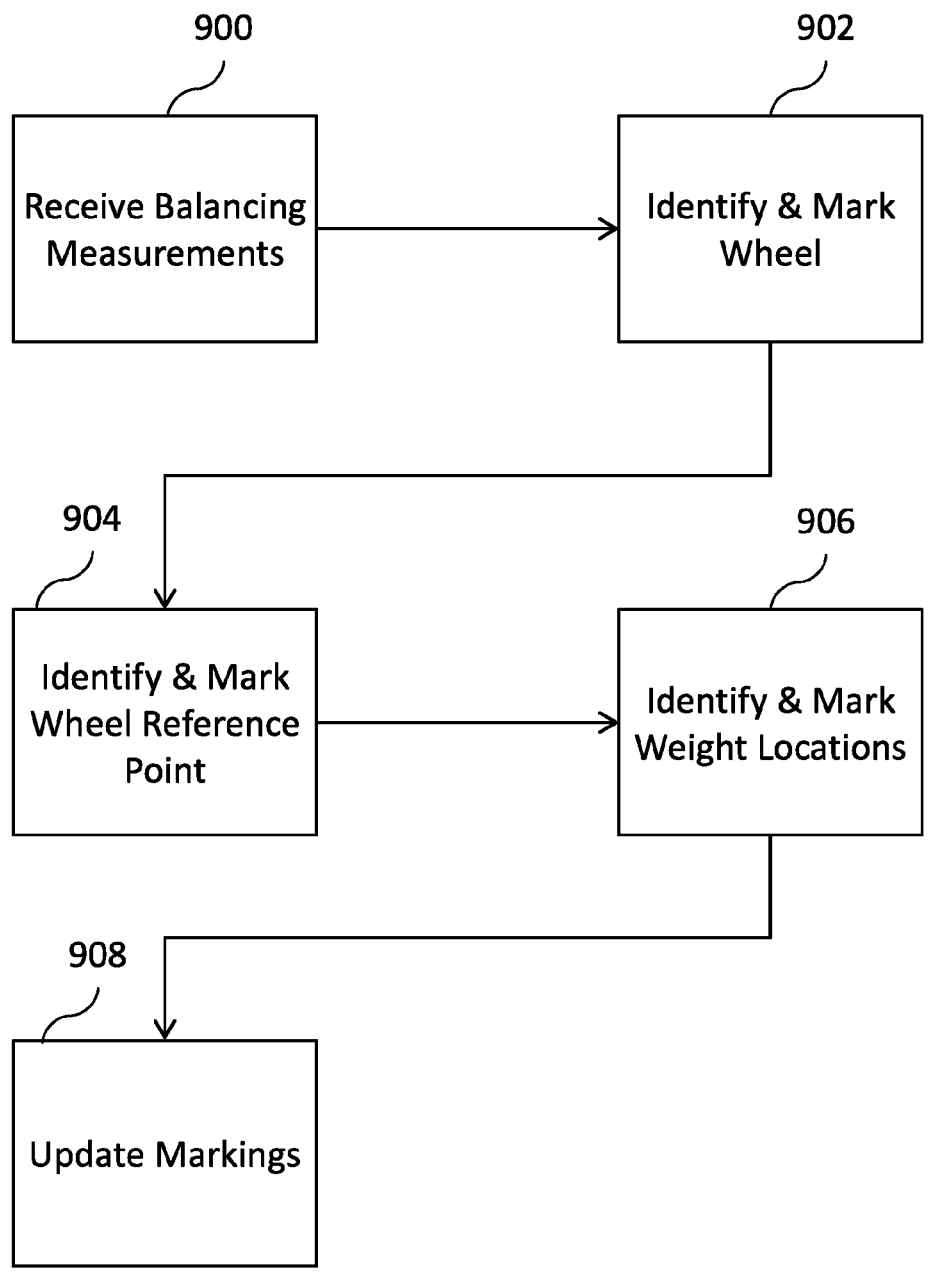
FIG. 9 is a flowchart of a set of steps that a system could perform to provide virtual balance reference points during tire balancing.

FIG. 9 is a flowchart of a set of steps that a system could perform to provide virtual balance reference points during tire balancing. Similar to collision repair, tire balancing is conventionally performed using a machine that displays markers on a static image of a wheel on a reference display, or by focusing a laser, light, or other visible marker on the wheel. As with collision repair, referring to a separate display or referencing a static image is not ideal, and marking lights may be interrupted by persons or objects during work.

In an augmented reality environment, wheel balancing measurements may be shown in near real-time through an AR device (100) while a technician works, which may reduce or eliminate the need to shift attention away from the wheel during work. The EAS system may receive (900) measurements related to the wheel balancing, which may include one or more positions along the wheel where a weight is needed in order to place the wheel in balance, orientation and mounting instructions, as well as the mass of each weight that needs to be placed. The AR device (100) may capture video or images of the wheels being worked upon, and the EAS (102) may use object recognition to identify and mark (902) each wheel, which may include simply outlining and labeling or numbering the wheel or displaying additional information such as the status of whether the wheel has been balanced or still needs to be balanced.

The EAS (102) may also identify and mark (904) a wheel reference point that may be used to determine the rotational position of the wheel during work. This reference may be identified using object recognition, for example, by image analysis to identify a valve stem, or by placing a QR code sticker along the wheel's circumference. Once the wheel reference is marked (904), the EAS (102) may render (906) one or more weight locations based upon the received (900) measurements. As the wheel rotates during work, the EAS (102) will detect that rotation using the reference point (904) and update (908) the weight markings to maintain the accuracy of the augmented environment during wheel rotations, balancing, or other movements.

Identifying and marking the weight locations (906) so that they are rendered and visible via the AR device (100) as virtual objects within the environment may be performed in a variety of ways. In one example, a simple dot or arrow could be overlaid upon the environment, along with a number or text indicating the mass of the needed weight. In another example, weight locations may be represented as red circles, and as correct weights are placed and identified by object recognition the red circle may disappear, shrink, or turn green. Other such implementations of the steps of FIG. 9 will be apparent to one of ordinary skill in the art in light of the disclosure herein.

Figure 10:
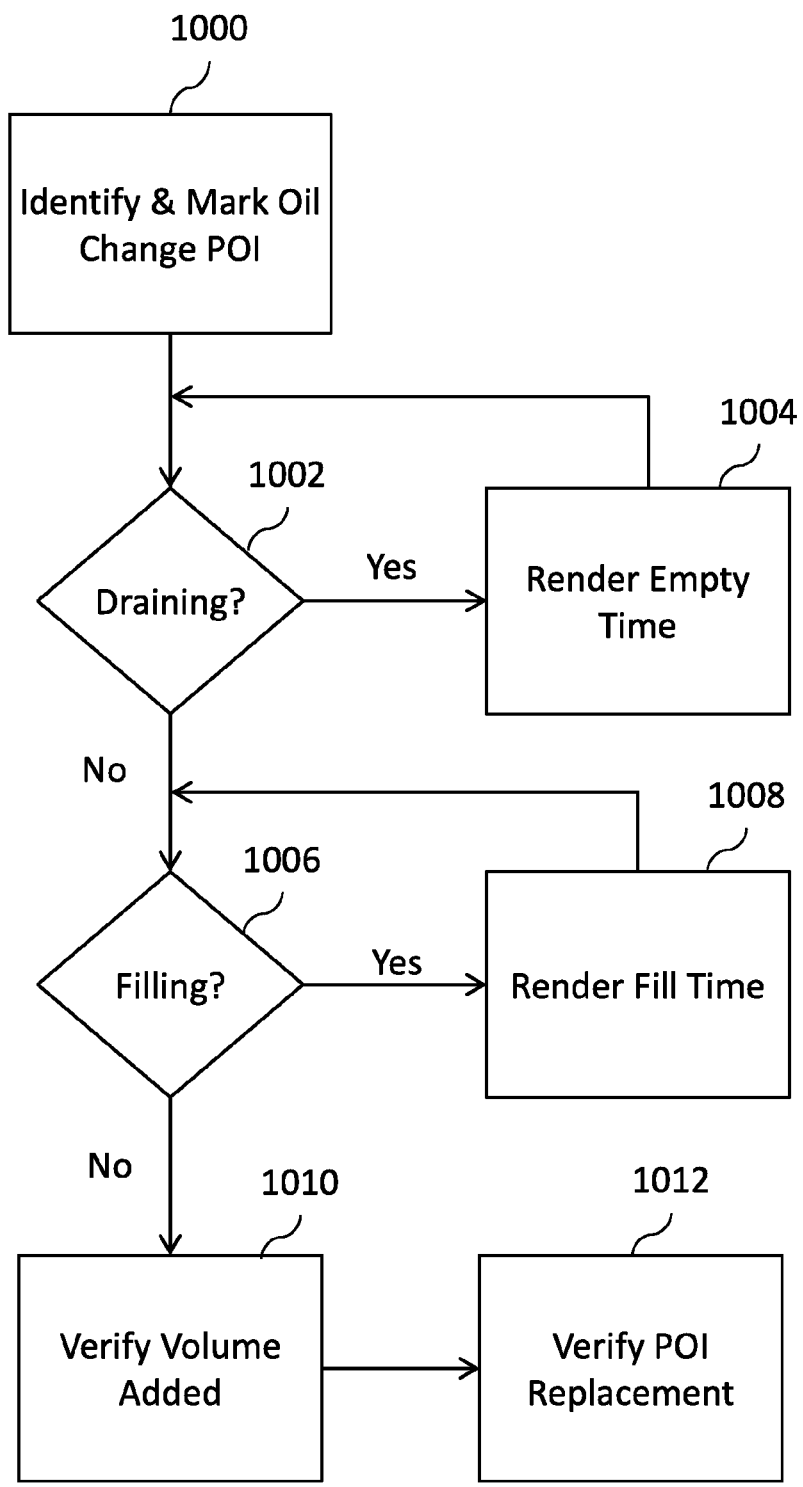
FIG. 10 is a flowchart of a set of steps that a system could perform to provide virtual guidance during an oil change.

FIG. 10 is a flowchart of a set of steps that a system could perform to provide virtual guidance during an oil change. Oil changes are an important part of basic vehicle maintenance, and for many vehicle owners will be the service that is most frequently needed and performed. Simple mistakes during oil changes, such as adding too much oil, not adding enough oil, or forgetting to replace a filter, plug, or cap, can have expensive consequences and are common horror stories shared amongst consumers of vehicle services. Often a verification check by a second technician is required to eliminate mistakes, however, this system is inefficient and still prone to human error.

In an augmented reality environment, an AR device (100) may provide additional information and guidance during an oil change that may improve the speed of the service and reduce or eliminate the chance of costly errors. During such a procedure, an AR device (100) worn by a technician may capture image or video of the work area and allow the EAS (102) to identify and mark (1000) one or more points of interest related to the oil change using object recognition (e.g., identifying an oil cap, drain plug, oil filter, etc.). The EAS (102) may also determine, based upon records available to it or based upon object recognition, the type of the vehicle being serviced, as well as any special requirements (e.g., volume of oil needed, type of oil needed, type of filter needed, etc.).

The EAS (102) may also determine, based upon input from a user or object recognition (e.g., a camera of AR device (100) captures removal of a drain plug) that the oil reservoir is currently draining (1002), and, while draining continues (1002) may render an empty time or status (1004) estimate based upon such factors as the type of vehicle, size of the oil reservoir, ambient temperature, and other factors. This rendering (1004) could be, for example, a highlighted bar that decreases over time during draining (1002), or it could be a simple timer that is rendered proximately to the vehicle through the AR device (100). When the procedure transitions to a filling state (1006), which the EAS (102) may determine based upon user input or object recognition (e.g., a camera of AR device (100) captures the placement of a fluid bottle or hose), a fill time or status may be rendered (1008) and viewable via the AR device (100). This could include, for example, a status bar that grows over time, a timer, or other status indicator. With such a system, one technician could efficiently manage oil change procedures on several vehicles at once, as viewing a particular vehicle via the AR device (100), even at some distance across a room or with partial obstructions, could display a status indicator regarding a process taking place on a remote vehicle so that the technician would not need to walk and check fluid draining or filling at close proximity.

Such a system may also include safety features to verify the volume of fluid added to a vehicle (1010), as well as replacement of POI (1012) such as caps, hoses, filters, or drain plugs. Fluid volume may be verified (1010) by, for example, receiving information from a pump device indicating the volume of fluid added to a particular vehicle and displaying a positive or negative indicator on the vehicle via the AR device (100). As another example, fluid volume may be verified by capturing images of the fluid bottles used for a particular vehicle via the AR device (100) and using object or text recognition to determine the type and volume of used bottles, then using that information to determine whether the vehicle received the required type and amount of fluid.

POI replacement may be verified (1012) by, for example, requiring the technician to inspect the vehicle and the immediate work area before the procedure is marked completed and the vehicle is released to the customer. Inspection of the vehicle and the work area provides an opportunity for the AR device (100) to use object recognition features to identify potential problems. For example, a visual inspection of the vehicle's oil drain and fill areas would produce images and video from the AR device (100) that could undergo image analysis to determine if a cap, filter, or plug had been removed and not replaced. Similarly, caps, plugs, or filters that are marked with an optical identifier (112) such as a QR code could have their presence verified on the vehicle, or, when inspecting the work area around the vehicle, a cap or plug marked with a QR code might be identified and marked with a warning indicator via the AR device (100). Once proper performance of the oil change is verified (1010, 1012), the AR device (100) could render a positive indicator proximately to the vehicle to let the technician know he or she can report the vehicle to another system or personnel as being completed.

Figure 11:
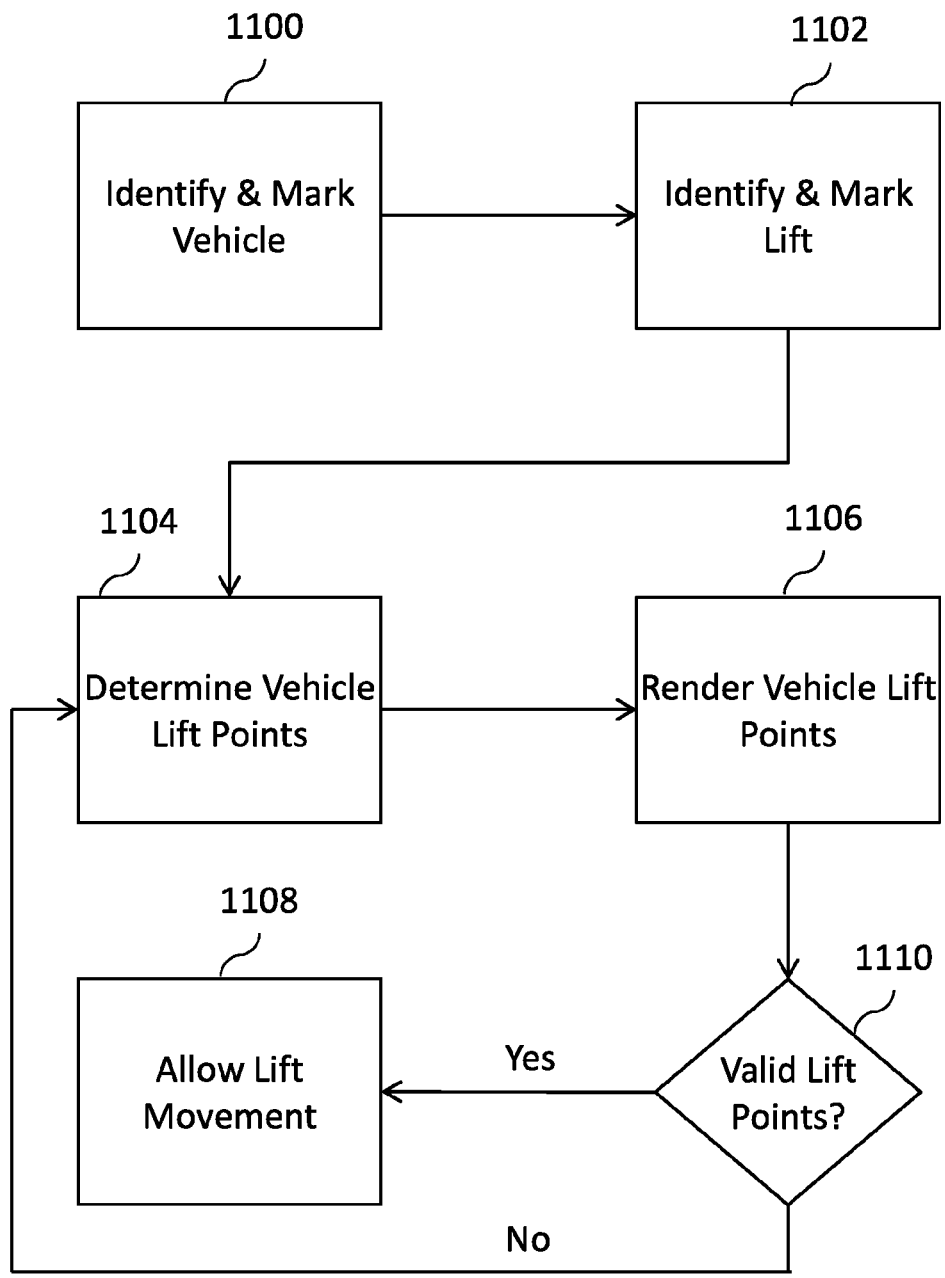
FIG. 11 is a flowchart of a set of steps that a system could perform to provide virtual lift indicators when preparing to raise a vehicle with a lift.

FIG. 11 is a flowchart of a set of steps that a system could perform to provide virtual lift indicators when preparing to raise a vehicle with a lift. The undercarriage of a vehicle can vary drastically across vehicle types and manufacturers, and there are few reliable standards that a service shop can apply in every situation. For example, some vehicles may have a creased or folded metal fin on the undercarriage that is designed to bear the weight of the vehicle, while others may have a reinforced foot or receiver for the same purpose. Some portions of an undercarriage that appear to be load-bearing may not actually be, and attempts to lift the vehicle by a non-load-bearing point may cause cosmetic and/or functional damage to the vehicle.

In an augmented reality environment, an AR device (100) may be used by a technician to view a lift and vehicle, and lifts points on both the vehicle as well as the lift itself may be marked with rendered symbols to aid a technician in safely placing the vehicle on the lift. In order to provide this feature, the EAS (102) may receive images and video of the vehicle and lift area and use object recognition to identify and mark (1100) the vehicle and the lift (1102). The EAS (102) may determine the vehicle lift points (1104) by, for example, identifying the type of vehicle based upon information available to it (e.g., via a service management system) or using object recognition (e.g., comparing the profile of the vehicle or recognizing a QR code applied to the vehicle), and then retrieving a set of safe lift points for that vehicle from a locally or remotely available database. The EAS (102) may determine that the correct adapters are being used to engage the vehicle with the lift, for example using object recognition (e.g., image recognition on the adapters) or a QR code applied to the adapters, based on a database of known safe adapters to be used on the vehicle. The EAS (102) may interface with load sensors on the lift to determine that the vehicle is within the correct rated capacity of the lift and adapters and/or that the vehicle weight is properly distributed among the lifting adapters.

Figure 15:
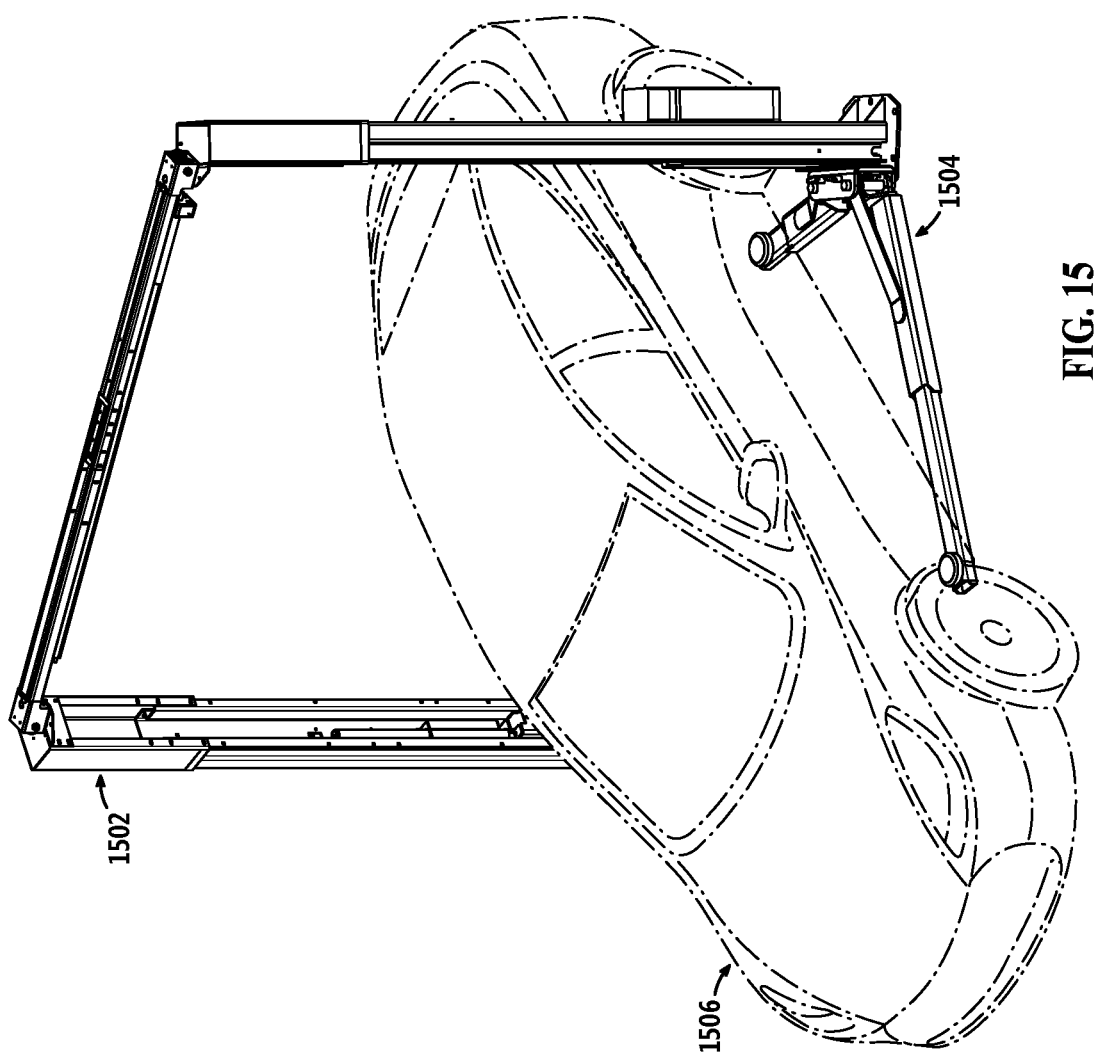
FIG. 15 is a schematic drawing of a vehicle lift and vehicle for use with the illustrated embodiment.
Figure 16:
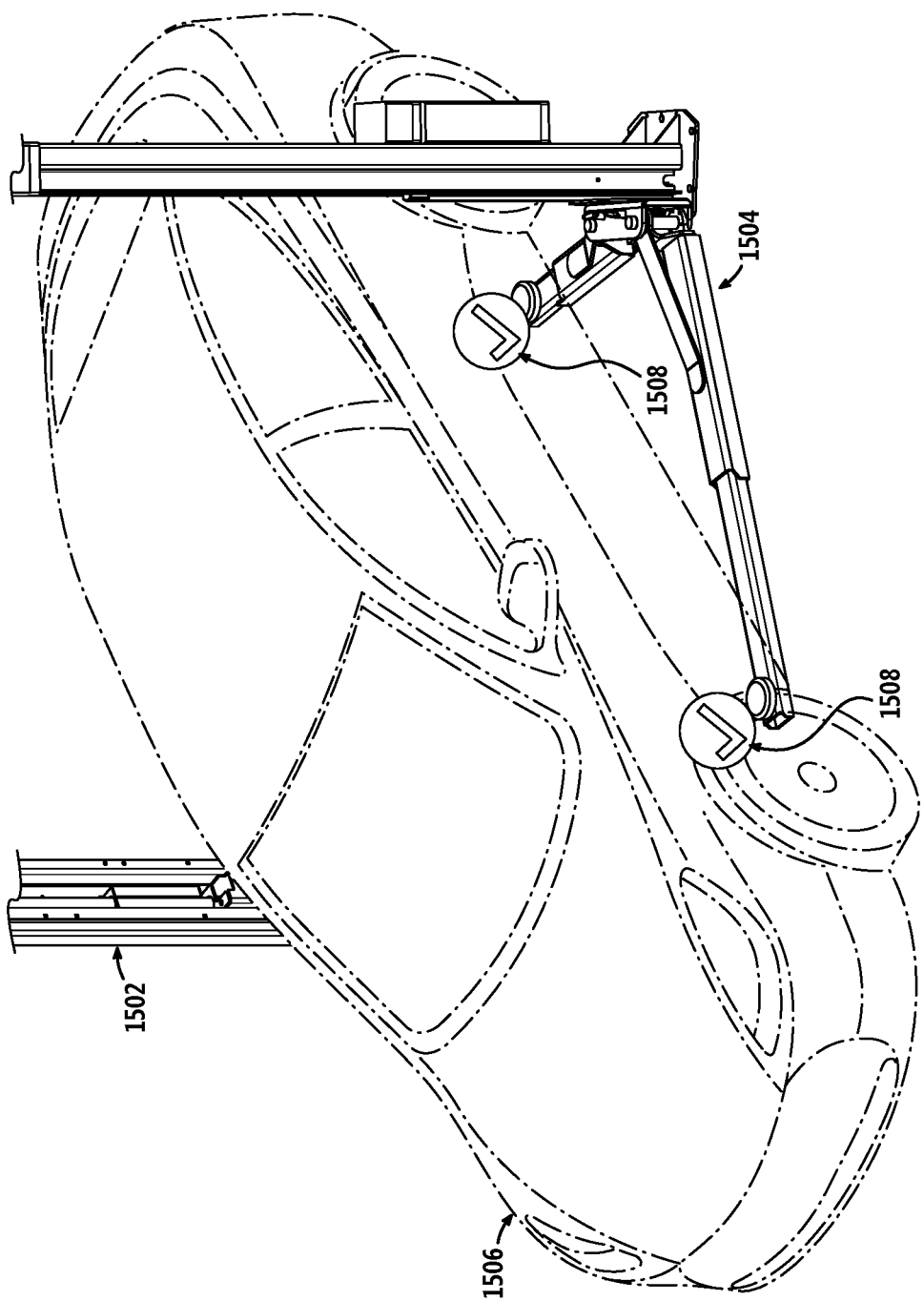
FIG. 16 is a schematic drawing of the vehicle lift and vehicle of FIG. 15 with a first augmented reality overlay according to the illustrated embodiment.
Figure 17:
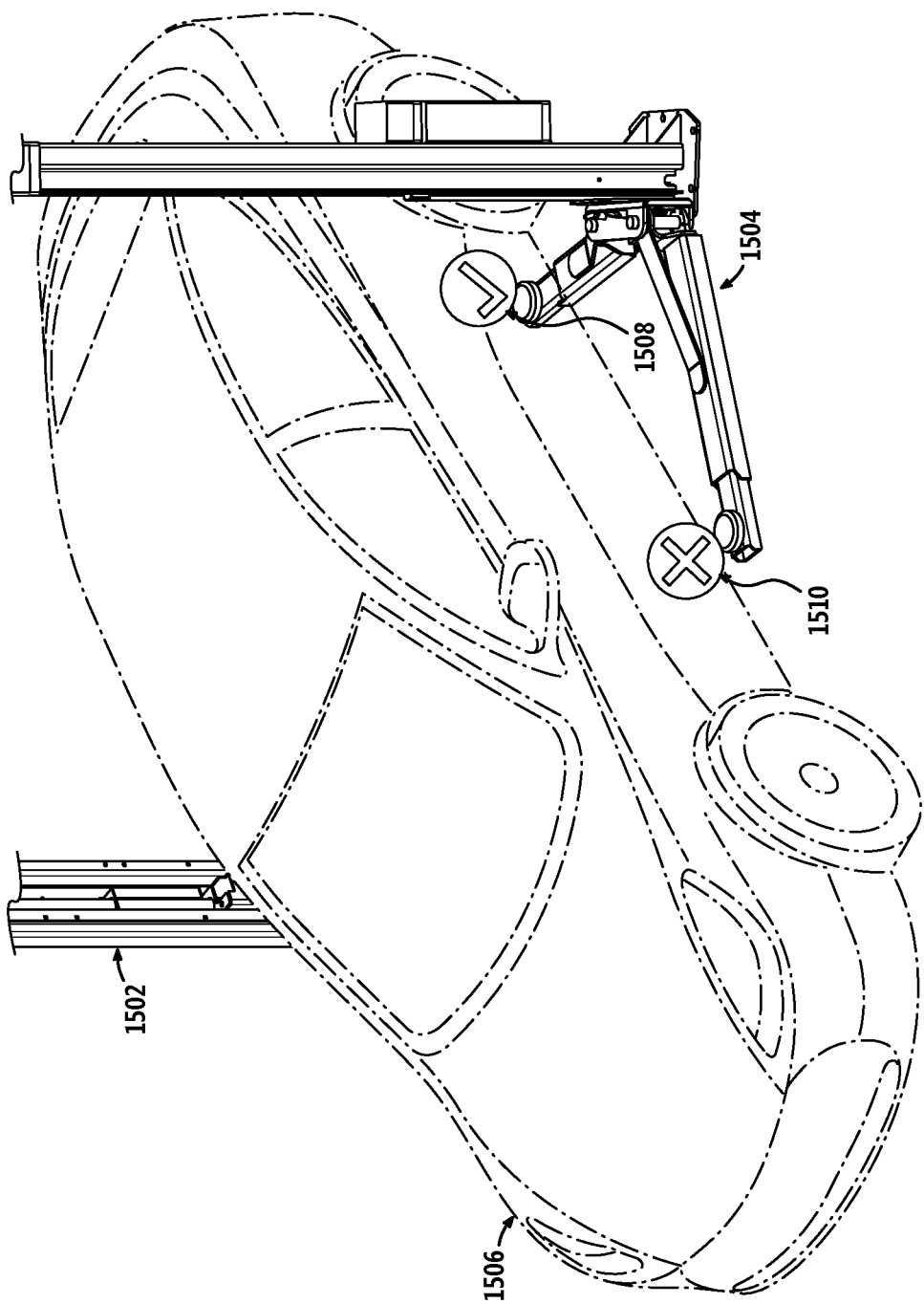
FIG. 17 is a schematic drawing of the vehicle lift and vehicle of FIG. 15 with a second augmented reality overlay according to the illustrated embodiment.

FIG. 15 illustrates another exemplary implementation. Here, lift (1502) includes lift arms (1504) that are to be positioned under lift points on vehicle (1506) for a lift operation. As shown in FIG. 16, if EAS (102) determines that lift arms (1504) are correctly positioned under the lift points of the vehicle (1506), AR device (100) renders overlays (1508) proximate to the lift arm (1504) or lift points so the user can move on to other preparations for the lift operation. If, as shown in FIG. 17, one of the lift arms (1504) is not correctly positioned under a lift point of vehicle (1506), AR device (100) renders an overlay (1510) to draw the user's attention to the fact.

Returning to FIG. 11, the EAS (102) may also cause markers or indicators for the determined (1104) lift points to be rendered (1106) via the AR device (100). Rendering (1106) the lift points may comprise, for example, marking a point on the vehicle with a first indicator, and marking a corresponding point on the lift with a matching indicator, so that the technician knows how to align the vehicle relative to the lift. Once the vehicle is placed on the lift, the EAS (102) may lock out lift movement until the AR device (100) is used to inspect each lift point and verify that the vehicle placement is valid (1110). Verifying or validating (1110) lift points (e.g., verifying contact between a structural portion of the lift and a lift point of a vehicle) may be performed manually such as by receiving an input from a user indicating that the verification has been performed, or may be performed automatically using object recognition techniques. In either case, the inspection (1110) or any inspection may require that a technician observe the object of interest (e.g., via the AR device (100)) for a period of time before such confirmation or validation is recognized. After any needed adjustments, if the vehicle placement is valid (1110), the EAS (102) may unlock and allow lift movement.

As an example of the above, the user may receive a message via the AR device (100) indicating that lift point contact must be inspected, and the lift may be locked to prevent use until inspection is complete. Once the AR device (100) is positioned and oriented such that the inspected lift point is within the field of view of the AR device (100), and within a threshold inspection distance, a timer may begin to count down until a period of fifteen seconds has elapsed, at which time the inspection of that lift point is complete. Once all lift points have been inspected, the system may unlock and allow lift movement (1108).

Figure 12:
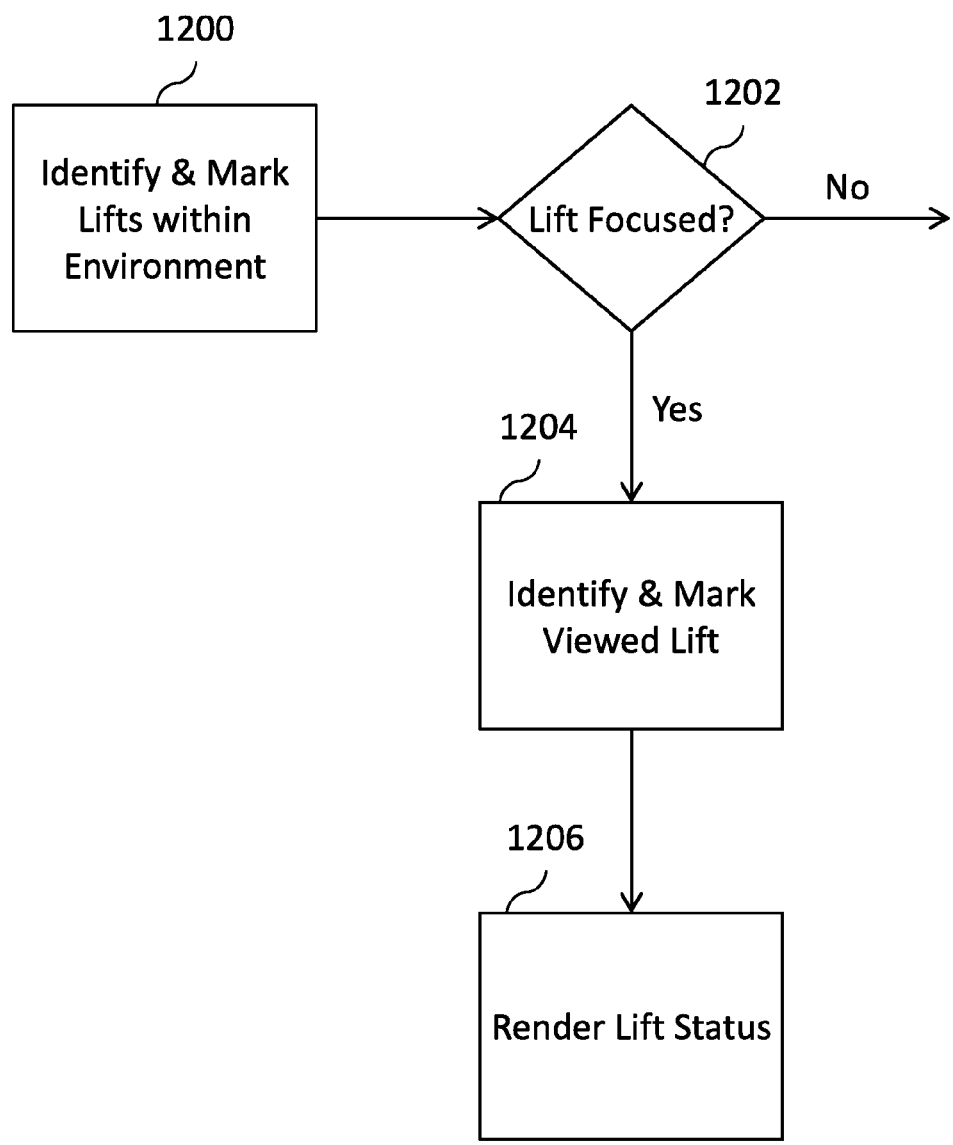
FIG. 12 is a flowchart of a set of steps that a system could perform to provide a virtual lift status in a service area.

FIG. 12 shows a flowchart of a set of steps that a system could perform to provide a virtual lift status in a service area. While some service areas may only have one lift, larger shops can have 10 or more spread across a large area. While some information on the status of these lifts may be available by checking service records, scheduled appointments, and other sources of information, or by walking to each lift and checking a control panel or inquiring with another technician, collecting information in this manner can be a time-consuming and error-prone task, and it introduces additional moving personnel to an already busy work area.

Figure 18:
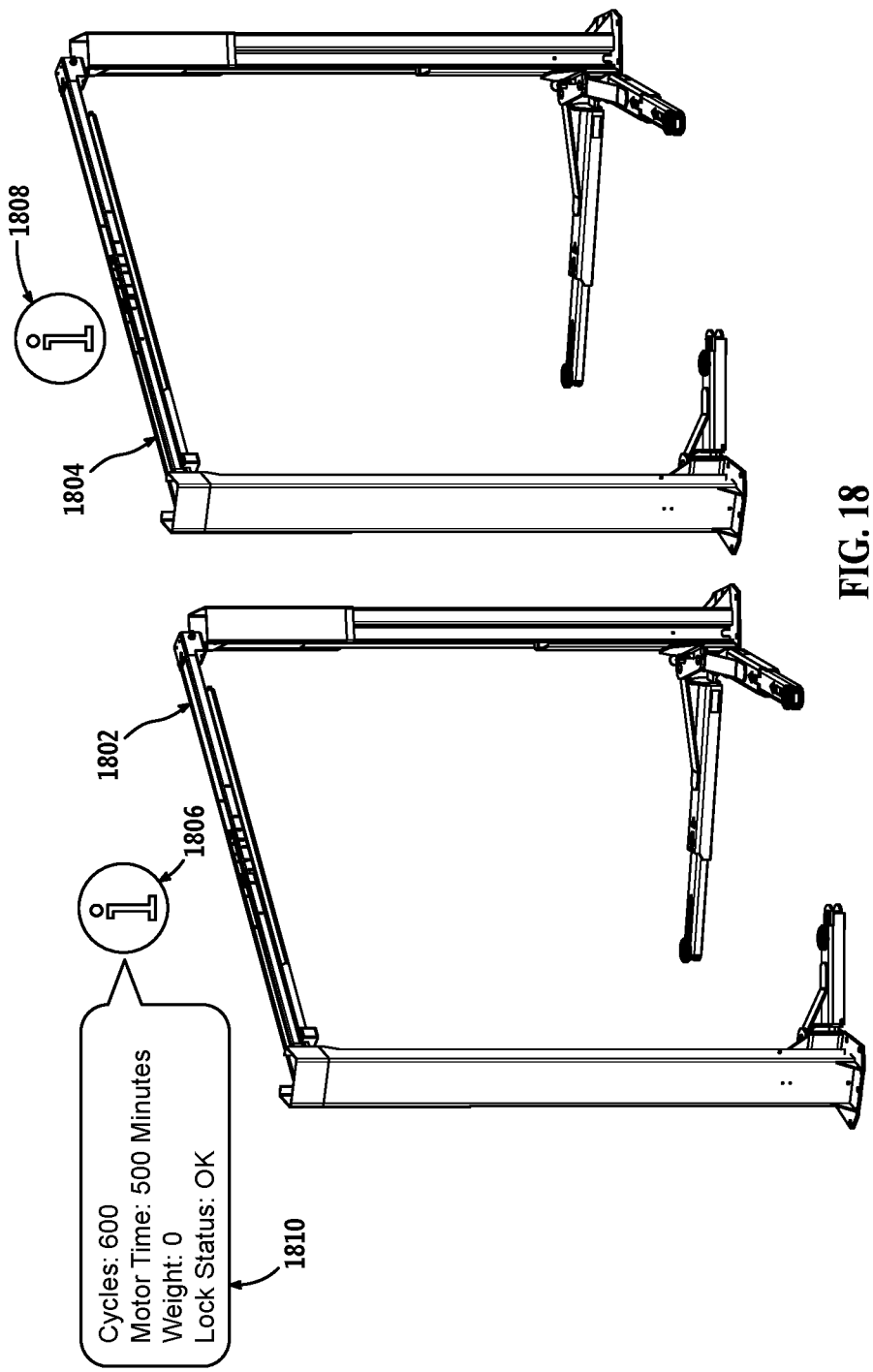
FIG. 18 it a schematic drawing of a vehicle lift with a third augmented reality overlay according to the illustrated embodiment.

In an augmented reality environment, a technician could view a large area having several lifts via the AR device (100), and an EAS (102) could render additional information about each lift via the AR device (100). In this manner, information could be gathered on multiple lifts, from afar, simply by looking in their direction. To provide this feature, the EAS (102) may identify and mark (1200) each lift that is within view (1202) of the AR device (100) at any given time with a simple number marking or identifier. When a lift is focused within the view, it may be identified and marked (1204) as being focused upon by the AR device (100), and additional lift status information may be rendered (1206). This could include information such as the lifts maintenance records, operational status, scheduling information related to whether the lift is in use or will soon be in use, temperature and hydraulic information, or other similar information. With such a feature, a supervisor could, from a single point within the room, or by walking down the center of the room, quickly gather information on each lift without having to directly approach the lift or inquire of any other systems or personnel about the lift. For example, as illustrated in FIG. 18, a view through AR device (100) may include lift apparatus (1802) and lift apparatus (1804). Information icons (1806, 1808) appear in the view above the lift apparatuses (1802, 1804). When one of these icons is selected using some user input technique or with the focus of the user's gaze, supplemental information (1810) about the lift is added to the overlay, such as the number of cycles the lift is been through, the amount of time the lift's motor has run, the weight currently being supported on the lift, the status of locking mechanisms on the lift, and other data as will occur to those skilled in the art.

In an augmented reality environment, a technician or lift inspector could perform tasks required for periodic lift inspection and maintenance. To provide this feature, the EAS (102) may provide virtual markings to guide the inspector or technician to various lift inspection points. The EAS (102) may automatically recognize lift inspection points and generate picture files to be uploaded to a digital inspection database. In some cases, the EAS (102) may be able to identify components requiring further maintenance.

A variety of implementations of the technology and system disclosed above exist and will be apparent to one of ordinary skill in the art in light of that disclosure. One such example may be a system or method for providing augmented reality features comprising an augmented reality device and an environment association system ("EAS"). The augmented reality device comprises an image capture device operable to capture image and/or video data and a display operable to render or show images of actual environments and images of virtual or rendered environments. The EAS (102) is configured to receive a set of environment data form the augmented reality device. The environment data may comprise data captured by the image capture device, data received by a wireless communication device of the augmented reality device, or both. The EAS (102) is further configured to identify one or more objects within the environment based upon the environment data. The EAS (102) is further configured to render one or more virtual objects based upon the one or more identified objects and cause the augmented reality device to render the one or more virtual objects via its display. The EAS (102) is further configured to identify actual objects and render virtual objects in order to provide one or more vehicle service features.

In the context of the exemplary system or method described above, in some implementations, the EAS (102) may be further configured to allow a user to move or prevent the user from moving a piece of equipment via an electronic control based upon the environment data, when the environment data indicates that the user has a substantially unobstructed view of the piece of equipment and that the user is located within a configured distance and viewing angle of the piece of equipment.

In the context of the exemplary system or method described above, in some implementations, the EAS (102) may be further configured to provide instructions during one or more steps of a procedure, wherein during each step of the procedure one or more objects within the environment data are identified by the EAS (102) and marked with a virtual object for display via the display of the augmented reality device.

In the context of the exemplary system or method described above, in some implementations, the EAS (102) may be further configured to provide additional information or options associated with an object that is identified within the environment data, and to present such additional information or options as virtual objects via the display, wherein the additional information or options may include status information, price, ordering information, maintenance information, task related information, instructions, or other options.

In the context of the exemplary system or method described above, in some implementations, the EAS (102) may be further configured to provide an augmented reality training environment by presenting one or more virtual training resources that may be viewed and interacted with using the augmented reality device.

In the context of the exemplary system or method described above, in some implementations, the EAS (102) may be further configured to receive a set of collision repair measurements indicating one or more points of an object in a post-collision state that need to be repaired to a pre-collision state (or at least to within manufacturer's specifications) and, based upon the set of collision repair measurements, render one or more corrective indicators on the object via the display of the augmented reality device, wherein the corrective indicator may be one or more of text, a color, a 2D object, and a 3D object.

In the context of the exemplary system or method described above, in some implementations, the EAS (102) may be further configured to receive a set of balancing measurements indicating one or more points along a wheel where a weight should be attached and, based upon the set of balancing measurements, render one or more virtual objects along the wheel indicating via the display showing where the weights should be attached. The EAS (102) may be further configured to identify a reference point of the wheel based upon a unique feature of the wheel or an optical identifier placed on the wheel, and it may update the one or more virtual objects along the wheel based upon movement of the reference point.

In the context of the exemplary system or method described above, in some implementations, the EAS (102) may be further configured to identify and render virtual objects for one or more objects during an oil change, wherein the one or more objects may include an oil cap, an oil filter, and a drain plug, wherein the rendered virtual objects may be a high-visibility indicator or other warning indicator indicating that the object must be replaced or re-installed. The EAS (102) may be further configured to render virtual information related to the oil change, which may include time estimates and/or estimated or measured progress of a process relating to draining an oil reservoir or filling an oil reservoir. The EAS (102) may be further configured to require a user to verify, by viewing with the augmented reality device, the replacement of marked objects, or verify the type and volume of oil added to a vehicle, before the procedure is completed.

In the context of the exemplary system or method described above, in some implementations, the EAS (102) may be further configured to identify the type of a vehicle, and based upon the vehicle type, determine one or more safe lift points of the vehicle. The EAS (102) may be further configured to render one or more virtual lift points via the display based upon the one or more safe lift points. The EAS (102) may be further configured to allow movement of the lift via only when the environment data indicates that the lift has been positioned safely based upon the one or more safe lift points.

In some embodiments, data (for example, scanner data, lift weight sensor output, and arm position monitor signals) is gathered and processed by an equipment controller via sensors on the respective equipment. In others, discrete sensors collect this data and transmit it for processing. In various embodiments the data is directly or indirectly communicated with EAS (102), AR device (100), or another device in the described systems.

In some embodiments, AR device (100) recognizes parts of the equipment such as target and lift arms via machine vision techniques as will occur to those skilled in the art. In such embodiments, the system processes available visual data and other information and creates a bounding box around the identified components. Information from the lift controller is rendered in augmented reality using the bounding box as a reference.

When an act is described herein as being performed "as a function of" a particular thing, the act is performed in different ways depending on one or more characteristics of the thing, whether constant, dynamic, or probabilistic. As used herein, a "state" or "property" of an object is any characteristic of the object, whether as the object exists independently or in relation to some other object.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. An environment association system ("EAS") comprising:
    a processor and a memory;
    an object recognition process configured to be executed by the processor in order to identify objects within images, the objects including one or more of a vehicle, a motorized vehicle lift, a vehicle repair tool, and an alignment fixture; and
    an EAS interface configured to communicate with a user device, the user device comprising a camera and a display;
    wherein the processor is configured to:
        receive an image captured by the camera of the user device;
        perform the object recognition process to identify a set of one or more objects within the image, the set of one or more objects including a set of one or more motorized vehicle lifts depicted in the image;
        determine, for at least one lift in the set of one or more motorized vehicle lifts, a virtual marking as a function of a state of the at least one lift, wherein the virtual marking comprises a vehicle lift status indicator for the at least one motorized vehicle lift;
        create a virtual overlay for the image based on a position of the at least one lift within the image and the virtual marking associated with the at least one lift; and
        provide the virtual overlay to the user device, wherein the virtual overlay is configured to cause the user device to simultaneously display the image and the virtual overlay via the display.

2. The EAS of claim 1, wherein:
    a vehicle appears in the captured image;
    the set of objects further includes a set of one or more lift points on the vehicle, and the at least one object comprises the set of one or more lift points;
    the virtual marking for each lift point in the set of one or more lift points is a virtual lift point indicator; and
    the virtual overlay has each virtual lift point indicator proximate to the location of each of the set of lift points in the image.

3. The EAS of claim 2, wherein the processor is configured to:
    when identifying the set of one or more objects within the image, identify a set of lift members for a lift depicted in the image;
    determine, for each lift point of the set of lift points, a corresponding lift member of the set of lift members.

4. The EAS of claim 3, wherein the processor is configured to, when identifying the set of lift points for the vehicle depicted in the image, identify a type of the vehicle based upon one or more of:
    a vehicle identification number associated with the vehicle; or
    an identification of the vehicle in the set of objects by the object recognition process.

5. The EAS of claim 3, wherein the processor is configured to:
    determine a spatial relationship between each lift point of the set of lift points and each corresponding lift member of the set of lift members;

where the spatial relationship indicates that any lift point is safely positioned relative to its corresponding lift member, determine the virtual lift point indicator for that lift point as a first form of virtual lift indicator; and where the spatial relationship indicates that any lift point is not safely positioned relative to its corresponding lift member, determine the virtual lift point indicator for that lift point as a second form of virtual lift indicator that is visually distinguishable from the first form of virtual lift indicator.

6. The EAS of claim 5, wherein the second form of virtual lift indicator is configured to cause the user device to display:

a characterization of the spatial relationship between that lift point and its corresponding lift member, and a required change in the spatial relationship between the lift point and its corresponding lift member to become safely positioned.

7. The EAS of claim 2, wherein the processor is configured to:

prevent operation of a motorized vehicle lift associated with the vehicle;

provide an indication via the user device that each lift point of the set of lift points must be inspected prior to operating the motorized vehicle lift;

receive data from the user device indicating that the set of lift points has been inspected; and after determining that the set of lifts points has been inspected, allow operation of the motorized vehicle lift.

8. The EAS of claim 7, wherein the processor is configured to, when determining that each lift point of the set of lift points has been inspected:

receive inspection images from the camera of the user device;

perform the object recognition process to identify a lift point of the set of lift points within the inspection images over a period of time, wherein the period of time is configured as a minimum period of time to perform an inspection, and when the period of time has elapsed, determine that the lift point has been inspected.

9. The EAS of claim 2, wherein the processor is configured to store data describing a plurality of lift adapters. and for each lift point of the set of lift points:

determine a type of lift point for that lift point;

determine a lift adapter from the plurality of lift adapters that is suitable for use with that type of lift point; and provide one or more indications via the user device of the lift adapter suitable for use with each lift point of the set of lift points.

10. The EAS of claim 2, wherein the processor is configured to, when identifying the set of lift points:

identify a set of optical markers in the image;

for each optical marker of the set of optical markers, determine a lift point associated with that optical marker; and identify the set of lift points based upon the lift point associated with each optical marker.

11. The EAS of claim 1, wherein the vehicle lift status indicator comprises three or more of:

a vehicle lift description;

a vehicle lift cycle counter;

a vehicle lift motor time;

a lock status; and a weight supported by the lift.

12. The EAS of claim 1, wherein the processor is configured to:

receive an indication from a user via the user device that a first motorized vehicle lift of the at least one lift should be focused on;

determine a focused vehicle lift status indicator for the first motorized vehicle lift;

change the virtual overlay to:

exclude all vehicle lift status indicators; and position the focused vehicle lift status indicator proximate to a position of the first motorized vehicle lift.

13. The EAS of claim 12, wherein:

the set of motorized vehicle lifts includes at least two vehicle lifts;

the focused vehicle lift status indicator comprises a first set of characteristics;

the vehicle lift status indicator comprises a second set characteristics, and the number of the first set of characteristics exceeds the number of the second set of characteristics.

14. The EAS of claim 1, further comprising an indoor positioning system in communication with the EAS interface, wherein the indoor positioning system is configured to determine a location and orientation of the user device, and wherein the processor is configured to:

determine a position of one or more local motorized vehicle lifts proximate to the location of the user device based upon a configuration associated with an area containing the position of the one or more local motorized vehicle lifts; and identify the set of motorized vehicle lifts based in part upon the location and orientation of the user device and the position of local motorized vehicle lifts in use proximate to the area.

15. The EAS of claim 1, wherein the processor is configured to:

identify a set of optical markers in the image;

for each optical marker of the set of optical markers, determine a motorized vehicle lift associated with that optical marker; and identify the set of motorized vehicle lifts based upon the motorized vehicle lift associated with each optical marker.

16. The EAS of claim 1, wherein performing the object recognition process comprises using the image and a remote object recognition dataset from a remote server.

17. The EAS of claim 16, wherein the processor is further configured to:

create a local object recognition dataset; and when identifying the set of motorized vehicle lifts, perform the object recognition process using the remote object recognition dataset, the local object recognition dataset, and the image.

18. The EAS of claim 17, wherein the processor is configured to provide at least a portion of the local object recognition dataset to the remote server, wherein the local object recognition dataset is configured to be integrated with the remote object recognition dataset in order to refine the remote object recognition dataset.

19. The EAS of claim 1, wherein the at least one lift object comprises the alignment fixture;

a state of the alignment fixture., as a function of which the virtual marking is determined, is its position relative to the vehicle, that position indicating whether a particular point on the vehicle is correctly positioned.

20. The EAS of claim 19, wherein the virtual marking associated with the alignment fixture has a particular characteristic when the particular point is correctly positioned and does not have the particular characteristic when the particular point is not correctly positioned.

* * * * *